(12) United States Patent
Sakoh et al.

(10) Patent No.: US 8,024,475 B2
(45) Date of Patent: Sep. 20, 2011

(54) COMMUNICATION METHOD

(75) Inventors: Noriyuki Sakoh, Kanagawa (JP);
Takeshi Iwatsu, Kanagawa (JP); Jun Moriya, Tokyo (JP); Yasuhiro Murase, Tokyo (JP); Shinsuke Yamashita, Kanagawa (JP)

(73) Assignee: Sony Corporation, Tokyo (JP)

( * ) Notice: Subject to any disclaimer, the term of this patent is extended or adjusted under 35 U.S.C. 154(b) by 830 days.

(21) Appl. No.: 10/556,893

(22) PCT Filed: May 18, 2004

(86) PCT No.: PCT/JP2004/007013
§ 371 (c)(1),
(2), (4) Date: Jan. 17, 2007

(87) PCT Pub. No.: WO2005/006606
PCT Pub. Date: Jan. 20, 2005

(65) Prior Publication Data
US 2008/0046587 A1 Feb. 21, 2008

(30) Foreign Application Priority Data

Jul. 14, 2003 (JP) ................................. 2003-274302
Aug. 11, 2003 (JP) ................................. 2003-291741
Sep. 4, 2003 (JP) ................................. 2003-313167
Sep. 29, 2003 (JP) ................................. 2003-338920

(51) Int. Cl.
*G06F 15/16* (2006.01)
(52) U.S. Cl. ......... 709/234; 709/227; 709/231; 709/241
(58) Field of Classification Search .................. 709/234, 709/227, 231, 241; 370/235, 230
See application file for complete search history.

(56) References Cited

U.S. PATENT DOCUMENTS

| | | | | |
|---|---|---|---|---|
| 2002/0062379 | A1* | 5/2002 | Widegren et al. | 709/227 |
| 2003/0174648 | A1* | 9/2003 | Wang et al. | 370/235 |
| 2003/0204613 | A1* | 10/2003 | Hudson et al. | 709/231 |
| 2004/0073947 | A1* | 4/2004 | Gupta | 725/134 |
| 2005/0005025 | A1* | 1/2005 | Harville et al. | 709/241 |
| 2005/0060701 | A1 | 3/2005 | Murase | |

(Continued)

FOREIGN PATENT DOCUMENTS

JP 5-219053 8/1993

(Continued)

OTHER PUBLICATIONS

U.S. Appl. No. 10/526,902, filed Aug. 16, 2005, Yamashita et al.

(Continued)

*Primary Examiner* — Kyung-Hye Shin
(74) *Attorney, Agent, or Firm* — Oblon, Spivak, McClelland, Maier & Neustadt, L.L.P.

(57) ABSTRACT

A client terminal CT transmits an acquisition request for musical composition information. An associated information provision server KS continuously receives the acquisition request at a given time interval. The associated information provision server KS transmits timing specification information along with the musical composition information corresponding to the acquisition request to the client terminal CT. The timing specification information specifies timing for the client terminal CT to transmit the acquisition request next. The associated information provision server KS controls a polling interval for acquisition requests. In this manner, acquisition requests can be distributed to those transmitted at a given time interval and those received in accordance with the timing specification information. A simple method can be used to prevent acquisition requests from being concentrated on the associated information provision server KS.

11 Claims, 22 Drawing Sheets

U.S. PATENT DOCUMENTS

2005/0091679 A1  4/2005  Tanaka et al.

FOREIGN PATENT DOCUMENTS

| JP | 10-285460 | 10/1998 |
| JP | 10-336169 | 12/1998 |
| JP | 2000-222360 | 8/2000 |
| JP | 2002-73625 | 3/2002 |
| JP | 2002-358283 | 12/2002 |
| JP | 2003-44477 | 2/2003 |
| JP | 2003-67239 | 3/2003 |

OTHER PUBLICATIONS

U.S. Appl. No. 10/554,542, filed Oct. 25, 2005, Iwatsu et al.
U.S. Appl. No. 10/564,317, filed Jan. 12, 2006, Kikkoji et al.
U.S. Appl. No. 10/557,207, filed Nov. 17, 2005, Kikkoji et al.
U.S. Appl. No. 10/555,654, filed Nov. 4, 2005, Kikkoji et al.
U.S. Appl. No. 10/556,944, filed Nov. 16, 2005, Kikkoji et al.
U.S. Appl. No. 10/563,258, filed Jan. 4, 2006, Iwatsu et al.
U.S. Appl. No. 10/557,141, filed Nov. 17, 2005, Murse et al.
U.S. Appl. No. 10/556,728, filed Nov. 14, 2005, Iwatsu et al.
U.S. Appl. No. 10/563,315, filed Jan. 4, 2006, Iwatsu et al.
U.S. Appl. No. 10/557,193, filed Nov. 17, 2005, Kikkoji et al.
U.S. Appl. No. 10/566,630, filed Jan. 31, 2006, Sakoh et al.
U.S. Appl. No. 10/561,187, filed Dec. 16, 2005, Araki et al.
U.S. Appl. No. 10/565,965, filed Jan. 26, 2006, Iwatsu.
U.S. Appl. No. 10/564,058, filed Jan. 10, 2006, Kikkoji et al.
U.S. Appl. No. 10/557,040, filed Nov. 16, 2005, Kikkoji et al.
U.S. Appl. No. 10/556,729, filed Nov. 14, 2005, Kikkoji et al.
U.S. Appl. No. 10/555,990, filed Nov. 8, 2005, Murase et al.
U.S. Appl. No. 10/560,229, filed Dec. 12, 2005, Kikkoji et al.
U.S. Appl. No. 10/564,062, filed Jan. 10, 2006, Kikkoji et al.
U.S. Appl. No. 10/567,689, filed Feb. 9, 2006, Kikkoji et al.
U.S. Appl. No. 10/567,033, filed Feb. 3, 2006, Sakoh et al.
U.S. Appl. No. 10/572,743, filed Mar. 21, 2006, Kikkoji et al.
U.S. Appl. No. 10/564,414, filed Jan. 12, 2006, Sakoh et al.
U.S. Appl. No. 10/571,540, filed Mar. 10, 2006, Sakoh et al.
U.S. Appl. No. 10/567,776, filed Feb. 9, 2006, Iwatsu et al.
U.S. Appl. No. 10/568,968, filed Feb. 22, 2006, Okuzawa.
U.S. Appl. No. 10/569,227, filed Feb. 23, 2006, Yasuda.
U.S. Appl. No. 10/573,580, filed Mar. 24, 2006, Sakoh et al.
U.S. Appl. No. 10/573,418, filed Mar. 27, 2006, Iwatsu et al.
U.S. Appl. No. 10/571,458, filed Mar. 13, 2006, Iwatsu et al.
U.S. Appl. No. 10/571,774, filed Mar. 15, 2006, Sakoh et al.
U.S. Appl. No. 10/573,647, filed Mar. 28, 2006, Kikkoji et al.

* cited by examiner

COMMUNICATION METHOD

TECHNICAL FIELD

The present invention relates to a communication method which appropriately controls a polling interval when a client terminal requests a server to acquire associated information such as titles and artist names related to musical compositions broadcasted in a radio program, for example.

BACKGROUND ART

Conventionally, radio receivers are used for audio stereo reproduction systems such as all-in-one stereo systems and separate stereo components, portable audio systems, car-mounted audio systems, and the like. The radio receiver receives and demodulates broadcast signals broadcast from a radio station and allows users to listen to programs and musical compositions.

On the other hand, the radio station publicizes various information about its programs on the Internet homepage. For example, the radio station sends broadcast signals to the audience, and provides it with musical composition information as associated information (hereinafter, to be referred to as "radio broadcast information") about broadcast musical compositions such as their titles and artist names as well as names and numbers of CDs that record the musical compositions.

There is proposed an audio reproduction apparatus as a client terminal having the radio reception function and the Internet connection function implemented in one system that simultaneously performs listening of radio programs and acquisition of musical composition information.

This audio reproduction apparatus allows a user to listen to a radio program from the audio reproduction apparatus and acquire musical composition information from associated information provision servers. The musical composition information includes titles, artist names, and the like related to musical compositions that are broadcast in the radio program.

The audio reproduction apparatus is capable of clipping a musical composition received from the radio station onto a hard disk. Further, the audio reproduction apparatus is capable of clipping musical composition information about the musical composition acquired from the associated information provision server onto the hard disk.

On the other hand, a consumer game machine is capable of downloading game contents from a game content server via a network. On a day when a new game is released, for example, the game content server is concentratively accessed from many consumer game machines aiming at data request information about the targeted game content.

To solve this problem, the game content server predetermines a delivery schedule based on system setting or a user option. According to the delivery schedule, the consumer game machine issues data request information about the game content to the game content server (e.g., see Patent Document 1: Jpn. Pat. Appln. Laid-open Publication No. 2002-202927).

Now, let us consider a case where a plurality of audio reproduction apparatuses issue acquisition requests for the musical composition information to the associated information provision server at a time. According to the method as described in patent document 1, however, the associated information provision server must perform complicated delivery schedule management for many audio reproduction apparatuses. There has been the problem of giving too much load on the associated information provision server.

DISCLOSURE OF THE INVENTION

The present invention has been made in consideration of the foregoing. It is therefore an object of the present invention to provide a communication method capable of being easily controlled so that a server can be free from too much loaded, complicated scheduling and can be protected against too many accesses for data request information to prevent excess traffic on networks.

To solve the above-mentioned problems, a communication method according to the present invention provides the steps of: continuously receiving request information transmitted from an external apparatus at a given time interval, the request information requesting associated information about a program being received by the external apparatus; and controlling a polling interval for the request information by transmitting timing specification information used to specify timing for the external apparatus to transmit the request information next along with associated information corresponding to the request information to the external apparatus.

In this manner, acquisition requests can be distributed to those received at a given time interval and those received in accordance with the timing specification information. A simple method can be used to prevent acquisition requests from being concentrated from the external apparatus.

A communication method according to the present invention provides the steps of: transmitting request information requesting associated information about a program being received to a server; receiving associated information corresponding to the request information and timing specification information used to specify timing to transmit the request information next from the server; and determining timing to transmit the request information in accordance with the timing specification information.

In this manner, the request information is transmitted at the timing that prevents the request information from being concentrated on the server. It is possible to fast acquire intended associated information from the server without causing excess traffic.

A server according to the present invention provides: a request information reception means for continuously receiving request information transmitted from an external apparatus at a given time interval, the request information requesting associated information about a program being received by the external apparatus; and a control means for controlling a polling interval for the request information by transmitting timing specification information used to specify timing for the external apparatus to transmit the request information next along with associated information corresponding to the request information to the external apparatus.

In this manner, acquisition requests can be distributed to those received at a given time interval and those received in accordance with the timing specification information. A simple method can be used to prevent acquisition requests from being concentrated from the external apparatus.

An external apparatus according to the present invention is a communication apparatus to request a given server for intended information and provides: a transmission means for transmitting request information requesting associated information about a program being received to the server; a timing specification information reception means for receiving associated information corresponding to the request information and timing specification information used to specify timing to transmit the request information next from the server; and a timing determination means for determining timing to transmit the request information in accordance with the timing specification information.

In this manner, the communication apparatus transmits the request information at the timing that prevents the request information from being concentrated on the server. It is possible to fast acquire intended associated information from the server without causing excess traffic.

A communication control program according to the present invention allows an information processing apparatus to perform the steps of: continuously receiving request information transmitted from an external apparatus at a given time interval, the request information requesting associated information about a program being received by the external apparatus; and controlling a polling interval for the request information by transmitting timing specification information used to specify timing for the external apparatus to transmit the request information next along with associated information corresponding to the request information to the external apparatus.

In this manner, acquisition requests can be distributed to those received at a given time interval and those received in accordance with the timing specification information. A simple method can be used to prevent acquisition requests from being concentrated from the external apparatus.

The present invention allows an information processing apparatus to perform the steps of: transmitting request information requesting associated information about a program being received to a server; receiving associated information corresponding to the request information and timing specification information used to specify timing to transmit the request information next from the server; and determining timing to transmit the request information in accordance with the timing specification information.

In this manner, the request information is transmitted at the timing that prevents the request information from being concentrated on the server. It is possible to fast acquire intended associated information from the server without causing excess traffic.

According to the present invention, acquisition requests can be distributed to those received at a given time interval and those received in accordance with the timing specification information. A simple method can be used to prevent acquisition requests from being concentrated from the external apparatus. Therefore, it is possible to provide a communication method, a server, an external apparatus, and a communication control program capable of being easily controlled so that a server can be free from too much loaded, complicated scheduling and can be protected against too many accesses for request information to prevent excess traffic on networks.

BEST MODE FOR CARRYING OUT THE INVENTION

Embodiments of the present invention will be described in detail with reference to the accompanying drawings.

Figure 1:
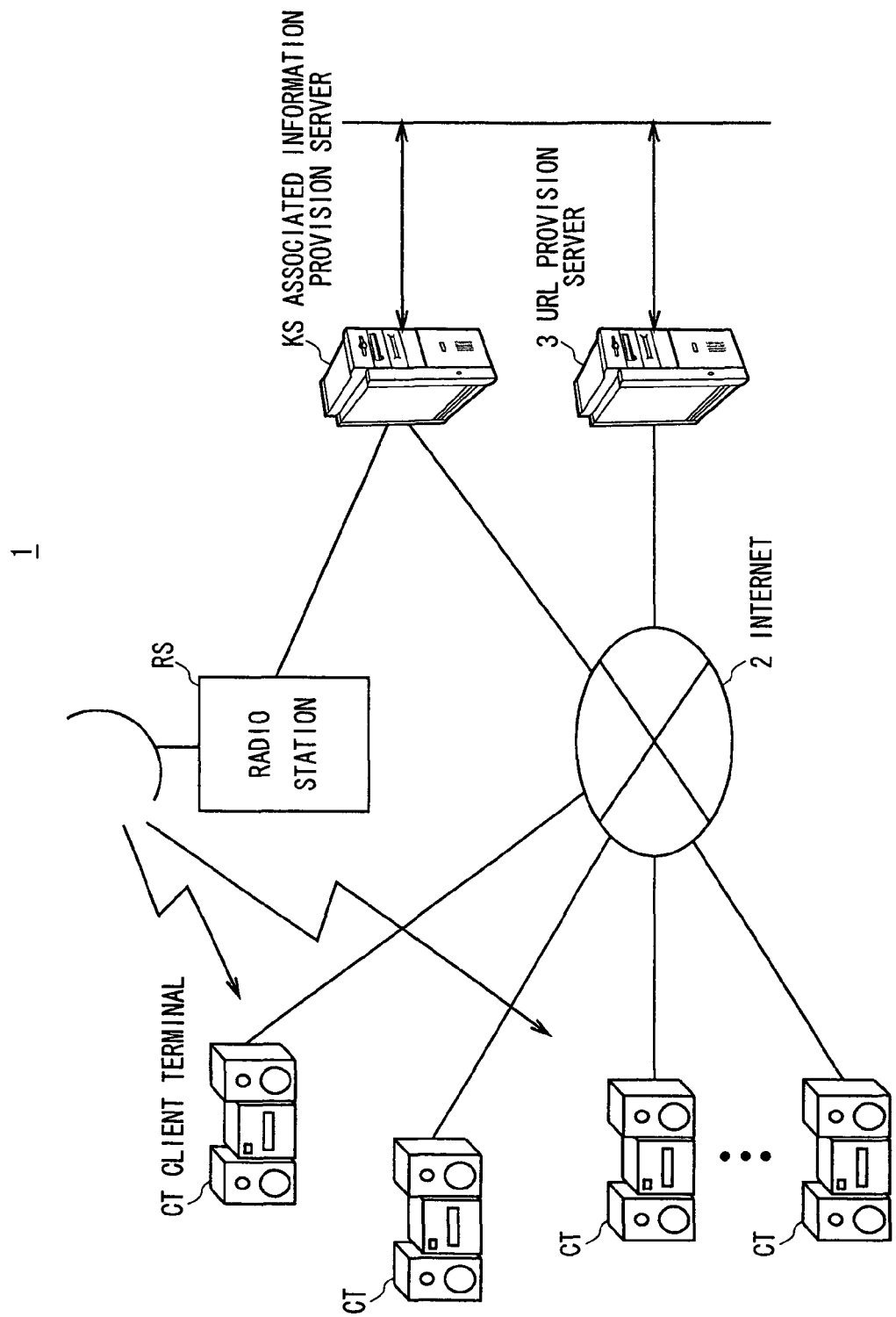
FIG. 1 is a schematic diagram showing the overall configuration of an information provision system according to a first embodiment of the present invention.

(1) First Embodiment (1-1) Overall Configuration of the Information Provision System As shown in FIG. 1, the reference numeral 1 denotes an information provision system constituting the present invention as a whole. A plurality of client terminal CTs receive broadcast from a radio station RS.

In the information provision system 1, the radio station RS connects with an associated information provision server KS comprising a computer. A leased line is used for this connection. In place of the radio station RS, the associated information provision server KS provides a homepage of the radio station RS. In response to an acquisition request from the plurality of client terminal CTs, the associated information provision server KS can provide musical composition information as associated information about musical compositions broadcast from the radio station RS via a network 2 such as the Internet.

In the information provision system 1, a URL provision server 3 comprising a computer is notified of URL (Uniform Resource Locator) information that indicates an access destination of the information provision service provided by the associated information provision server KS using the homepage and the like.

If a change is made in the URL indicating the access destination of the information provision service, the URL provision server 3 manages the changed URL according to notification from the associated information provision server KS. The URL provision server 3 can always provide the most recent URL in response to an inquiry from the client terminal CT about the access destination of the information provision service provided by the radio station RS.

Since the radio broadcast is limited to receivable areas, the same frequency may be commonly shared among a plurality of areas. For example, the 80.0 MHz frequency is used by FM Tokyo in the Tokyo metropolitan area and by FM Aomori in the Tohoku district.

Accordingly, the client terminal CT cannot specify the radio station RS only by specifying the frequency for the URL provision server 3. The client terminal CT further notifies the URL provision server 3 of specific information called a call sign to specify the radio station RS. In this manner, the client terminal CT can reliably receive the URL from the URL provision server 3. As mentioned above, the URL indicates the access destination of the information provision service provided by the radio station RS.

(1-2) Configuration of the Radio Station RS

Figure 2:
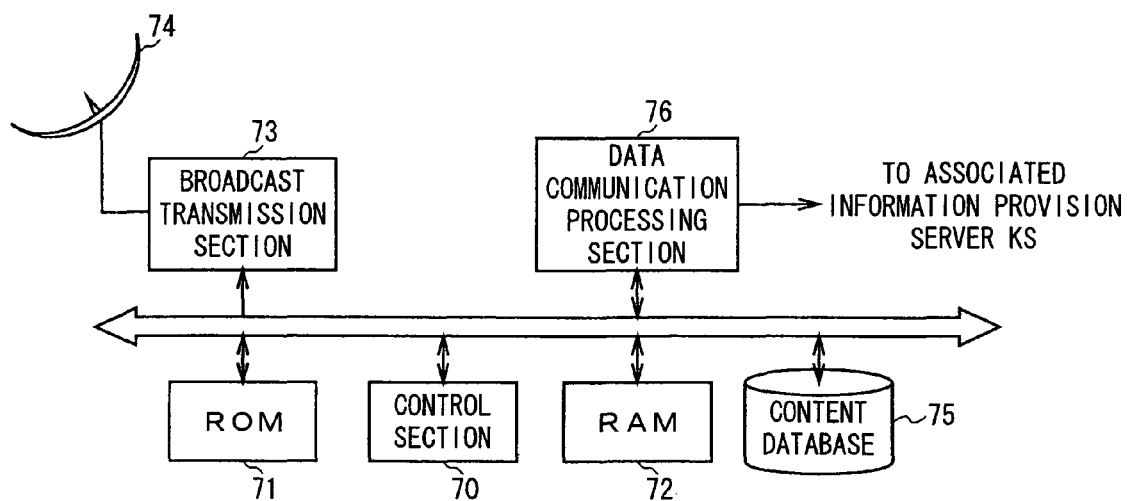
FIG. 2 is a schematic block diagram showing the configuration of a radio station.

As shown in FIG. 2, the radio station RS includes a control section 70 comprising a CPU (Central Processing Unit). The control section 70 uses a ROM (Read Only Memory) 71 and RAM (Random Access Memory) 72 to start basic programs such as an OS (Operating System) and various application programs. Based on these programs, the control section 70 controls the entire system in a unified fashion. The radio station RS performs processes such as program broadcasting to broadcast programs from a broadcast transmission section 73 to the client terminal CT via an antenna 74.

The radio station RS uses a content database 74 to store many contents such as previously recorded programs and musical compositions to be broadcast in the programs. The radio station RS broadcasts the program according to a program schedule and broadcasts musical composition contents in the program as needed.

In this case, the radio station RS uses a data communication processing section 76 to notify the associated information provision server KS that musical compositions are broadcast in the program. In addition, the radio station RS notifies the associated information provision server KS which program is currently being broadcast.

(1-3) Configuration of the URL Provision Server

Figure 3:
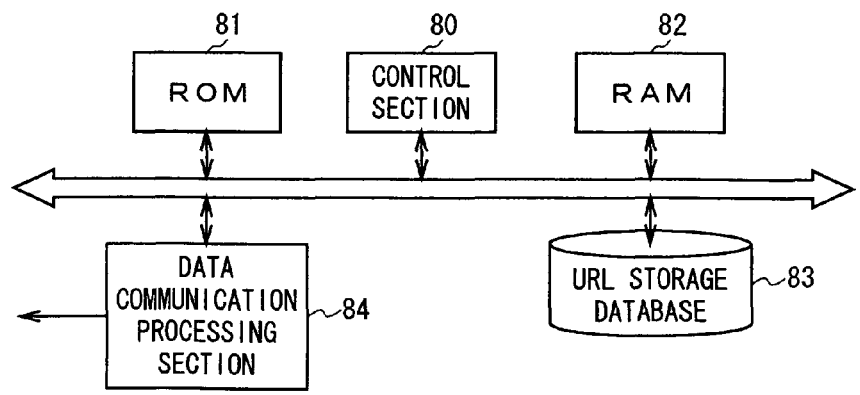
FIG. 3 is a schematic block diagram showing the configuration of a URL provision server.

As shown in FIG. 3, the URL provision server 3 includes a control section 70 comprising a CPU. The control section 70 uses ROM 81 and RAM 82 to start basic programs such as an OS and various application programs. Based on these programs, the URL provision server 3 performs overall control, specified operations, and the like.

The URL provision server 3 receives a call sign from the client terminal CT, then the server 3 searches a URL storage database 83 for a URL of the homepage provided as an information provision service by the radio station RS corresponding to the call sign. The URL provision server 3 returns the URL to the client terminal CT via a data communication processing section 84.

(1-4) Configuration of the Associated Information Provision Server

Figure 4:
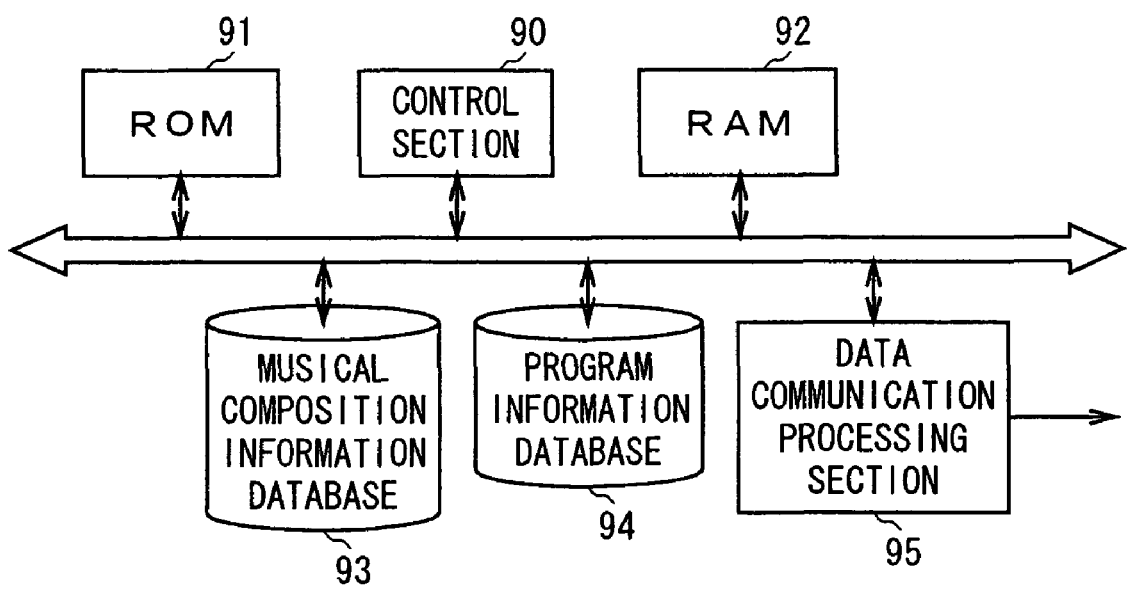
FIG. 4 is a schematic block diagram showing the configuration of an associated information provision server.

As shown in FIG. 4, the associated information provision server KS includes a control section 90 comprising a CPU. The control section 90 uses a ROM 91 and RAM 92 to start basic programs such as an OS and various application programs. Based on these programs, the associated information provision server KS performs overall control, specified operations, and the like.

The associated information provision server KS searches a musical composition information database 93 for musical composition information about musical compositions broadcast in a program by the radio station RS, for example. The associated information provision server KS provides the musical composition information as associated information to the plurality of client terminals CT via the data communication processing section 95.

Further, the associated information provision server KS searches a program information database 94 for program information about performers, a DJ name, genres, and the like associated with a program broadcast by the radio station RS. The associated information provision server KS provides the program information as associated information to the plurality of client terminals CT via the data communication processing section 95.

(1-5) Circuit Configuration of the Client Terminal CT

Figure 5:
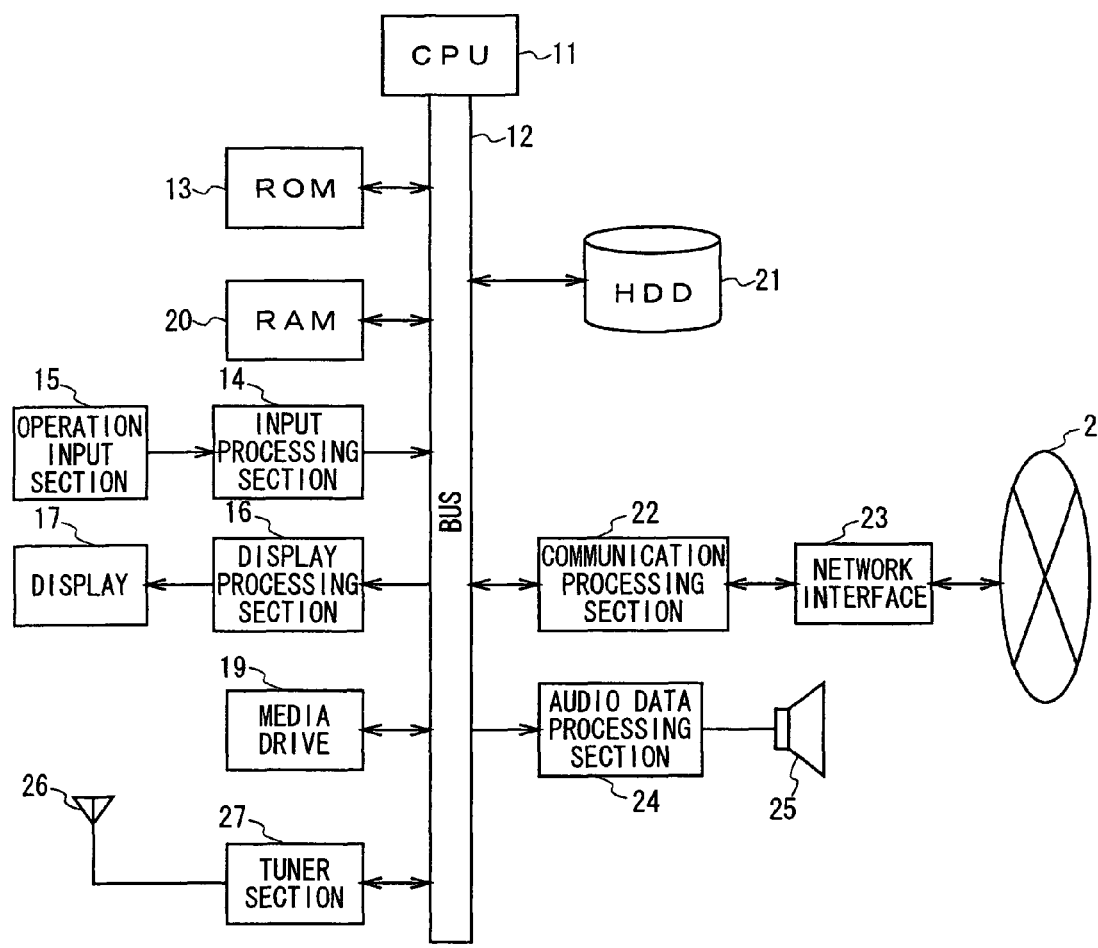
FIG. 5 is a schematic block diagram showing the circuit configuration of a client terminal.

As shown in FIG. 5, a CPU 11 of the client terminal CT reads basic programs such as an OS and various application programs from a ROM 13 connected via a bus 12 and expands the programs in a RAM 20. Based on these programs, the CPU 11 performs overall control, specified operations, and the like. For example, the CPU 11 performs communication operations via the network 2, input/output operations in relation to users, reproduction of contents from media, writing of contents downloaded from the radio station RS onto a hard disk drive (HDD) 21, management of contents, and the like.

The operation input section 15 sends input information to an input processing section 14. The input information corresponds to user operations for various operation devices provided on the surface of the main unit cabinet or a remote controller (not shown). The input processing section 14 applies specified processes to the input information and sends it as an operation command to the CPU 11. The CPU 11 performs processes corresponding to the operation command.

A display 17 represents a display device such as a liquid crystal display and may be directly attached to the surface of the main unit cabinet or may be externally connected. The display 17 displays processing results from the CPU 11 and the other various information.

A media drive 19 reproduces, for example, a CD (Compact Disc) or Memory Stick (registered trademark) comprising flash memory and the like. An audio data processing section 24 digital-to-analog converts the reproduction result which is then output from a 2-channel speaker 25.

When the CPU 11 reproduces data, e.g., a musical composition's audio content via the media drive 19, the audio content can be stored as an audio data file in a hard disk drive 21.

Further, the CPU 11 uses the media drive 19 to read a plurality of still pictures stored in Memory Stick. These still pictures can be displayed as a slideshow on the display 17 via a display processing section 16.

In addition, the CPU 11 can randomly access and read a plurality of musical compositions stored in the hard disk drive 21 to reproduce the musical compositions in a user-specified order like a jukebox.

A tuner section 27 is equivalent to an AM or FM radio tuner, for example. The tuner section 27 demodulates a broadcast signal received at an antenna 26 under the control of the CPU 11. The result, as a broadcast audio, is passed to the audio data processing section 24 and is output from the speaker 25.

A communication processing section 22 encodes transmission data under the control of the CPU 11. The communication processing section 22 uses a network interface 23 to transmit data to external network-compliant devices via a network 2. The communication processing section 22 uses the network interface 23 to receive data from external network-compliant devices and decodes the received data. The communication processing section 22 then transfers the decoded data to the CPU 11.

(1-6) Directory Management of Contents

Figure 6:
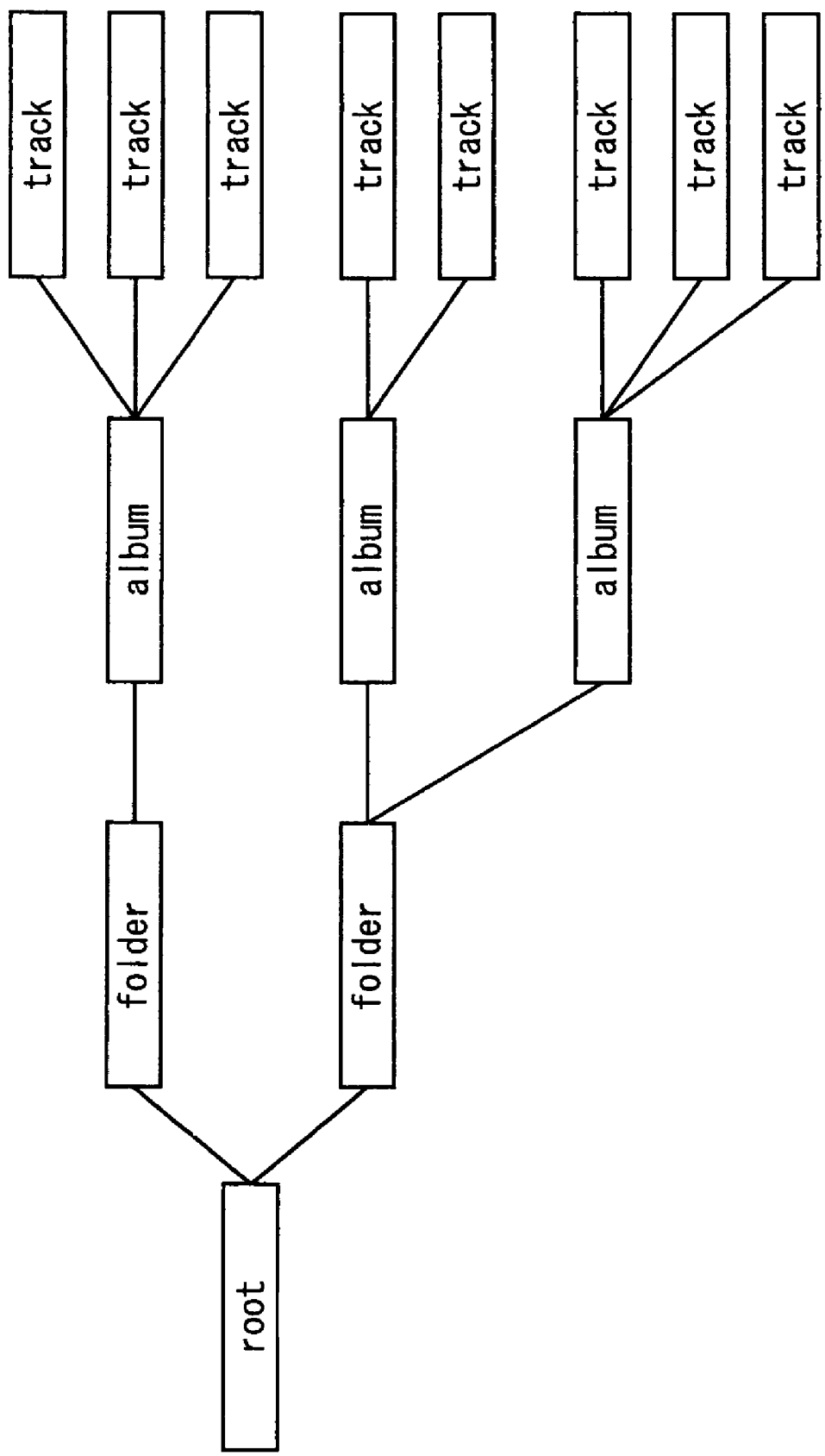
FIG. 6 is a schematic diagram illustrating directory management of contents.

The CPU 11 of the client terminal CT manages contents to be stored in the hard disk drive 21 according to directory structure as shown in FIG. 6. There are created any number of "folder" directories within a specified range under a "root" directory. The "folder" directory is created in accordance with a genre of contents, an owner user, and the like.

Under the "folder" directory, there are created any number of "album" directories within a specified range. The "album" directory corresponds to one album title, for example. The "album" directory stores one or more "track" files belonging to the "album" directory. That is to say, the "track" file is equivalent to one musical composition, i.e., a content.

A database file is stored in the hard disk drive 21 and is used for the directory management of contents.

(1-7) Program Module Configuration of the Client Terminal CT

Figure 7:
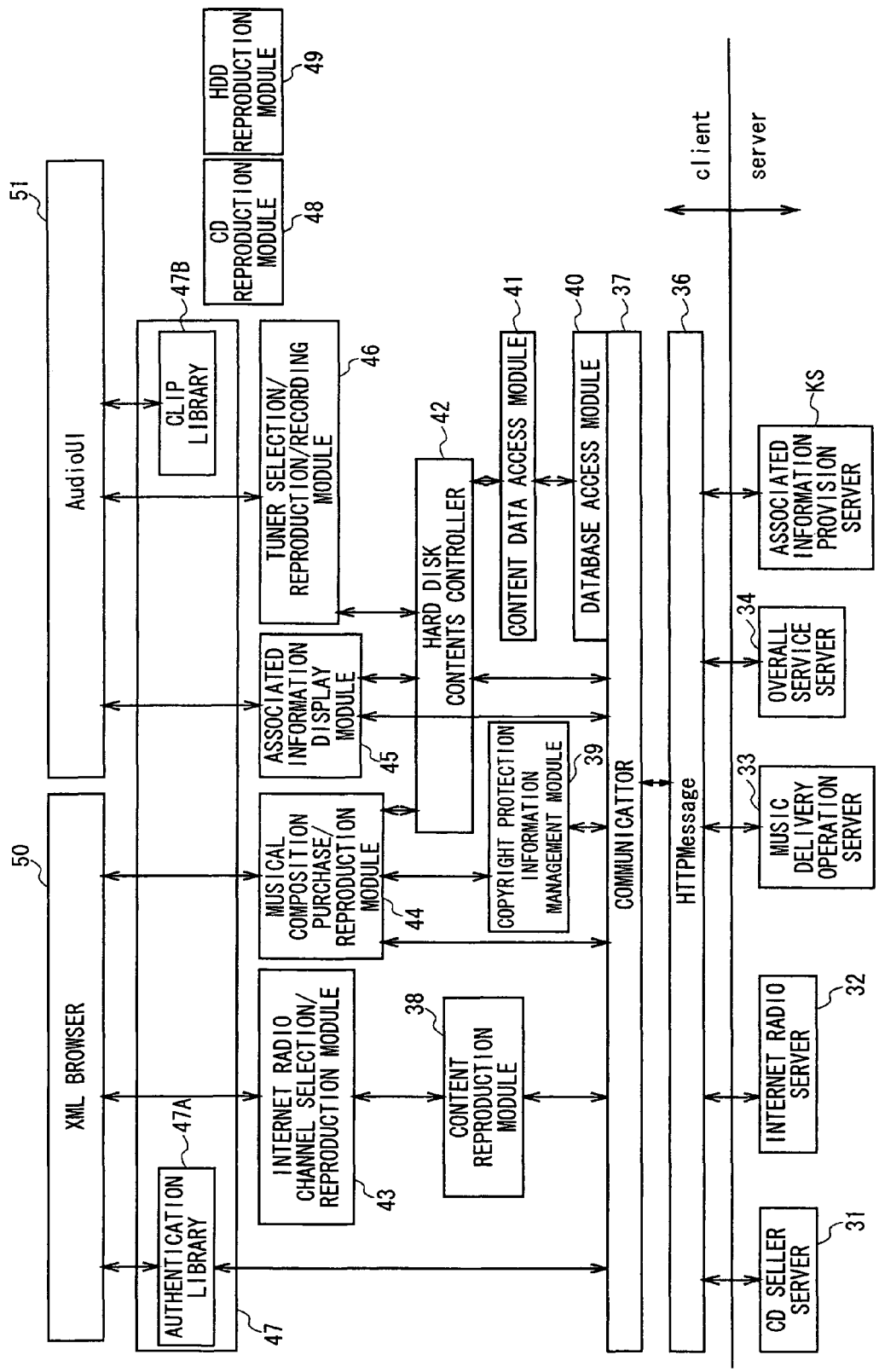
FIG. 7 is a schematic diagram showing program modules of the client terminal.

As shown in FIG. 7, the client terminal CT comprises program modules operating under the OS. Specifically, the client terminal CT interacts with various servers such as a CD seller server 31 to sell CDs, an Internet radio server 32, a music delivery operation server 33, an overall service server 34, and the associated information provision server KS.

An HTTP (Hyper Text Transfer Protocol) message program uses HTTP communication to interact with various servers such as the CD seller server 31, the overall service server 34 to provide overall services, and the associated information provision server KS. Any communicator program 37 is a communication module to communicate with the overall service server 34 and the like.

Above the any communicator program 37, there are a content reproduction module 38 and a copyright protection information management module 39. The content reproduction module 38 interprets codec information of contents and reproduces the contents. The copyright protection information management module 39 handles information about copyright protection. The content reproduction module 38 and the copyright protection information management module 39 correspond to an Internet radio channel selection/reproduction module 43 and a musical composition purchase/reproduction module 44, respectively. The Internet radio channel selection/reproduction module 43 selects and reproduces Internet radio channels. The musical composition purchase/reproduction module 44 controls purchase of musical compositions and reproduces samples.

An XML (eXtensible Markup Language) browser 50 is positioned above the Internet radio channel selection/reproduction module 43 and the musical composition purchase/reproduction module 44. The XML browser 50 interprets XML files from various servers and displays them on the display 17.

For example, a user selects a musical composition using the XML browser 50. The selected musical composition is purchased through the musical composition purchase/reproduction module 44 and is written to the hard disk drive 21 via a hard disk contents controller 42.

The any communicator program 37 connects with an authentication library 47A of an any library 47. The authentication library 47A authenticates various servers such as the overall service server 34.

Above the any communicator program 37, there are a database access module 40, a content data access module 41, and a hard disk contents controller 42.

The database access module 40 accesses various databases configured in the hard disk drive 21. The content data access module 41 accesses contents stored in the hard disk drive 21. The hard disk contents controller 42 manages contents stored in the hard disk drive 21.

Above the hard disk contents controller 42, there are an associated information display module 45 and a tuner selection/reproduction/recording module 46. The associated information display module 45 displays titles and artist names of musical compositions broadcast by the radio station RS. The tuner selection/reproduction/recording module 46 selects a radio station RS and records musical composition contents received from the radio station RS on the hard disk drive 21.

When a musical composition is received from the radio station RS selected via an audio user interface 51, for example, the received musical composition is written to the hard disk drive 21 via the content data access module 41.

The associated information display module 45 receives associated information from the associated information provision server KS via the HTTP message program 36. The associated information includes titles and artist names of the musical compositions currently broadcast by the radio station RS corresponding to the tuner selection/reproduction/recording module 46. The associated information is displayed on the display 17 via the audio user interface (UI) 51.

The associated information can be not only displayed on the display 17 via the audio user interface 51, but also temporarily stored in a clip library 47B of the any library 47. According to a user instruction, the associated information is finally stored in the hard disk drive 21 via the database access module 40.

The other program modules for the client terminal CT include a CD reproduction module 48 and an HDD reproduction module 49. The CD reproduction module 48 reproduces CDs. The HDD reproduction module 49 reproduces the hard disk drive 21. A reproduction result is output via the audio data processing section 24 and the speaker 25.

(1-8) Polling Interval Control Sequence

Figure 8:
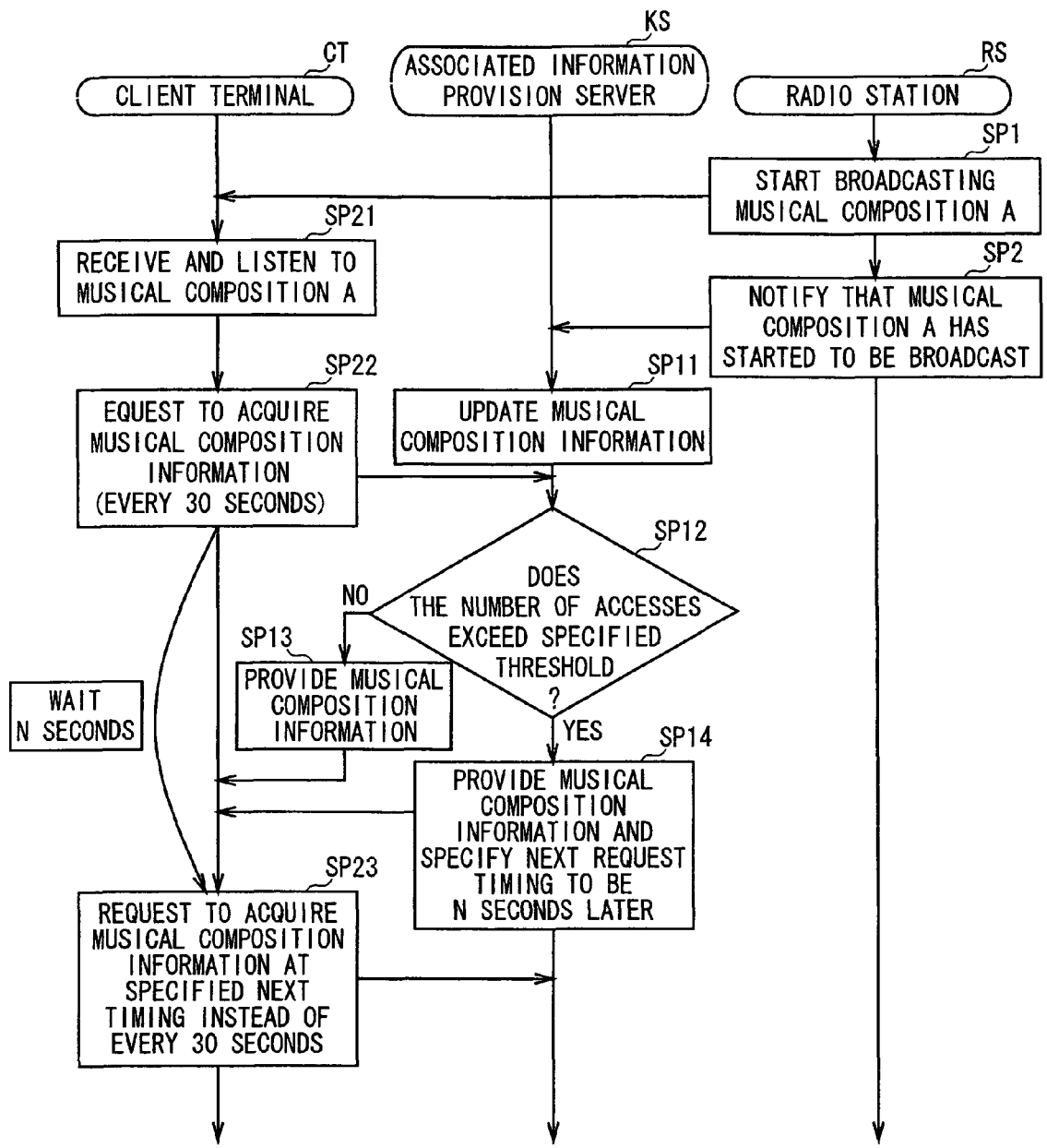
FIG. 8 is a schematic diagram showing a polling interval control sequence with a delay time specified.
Figure 9:
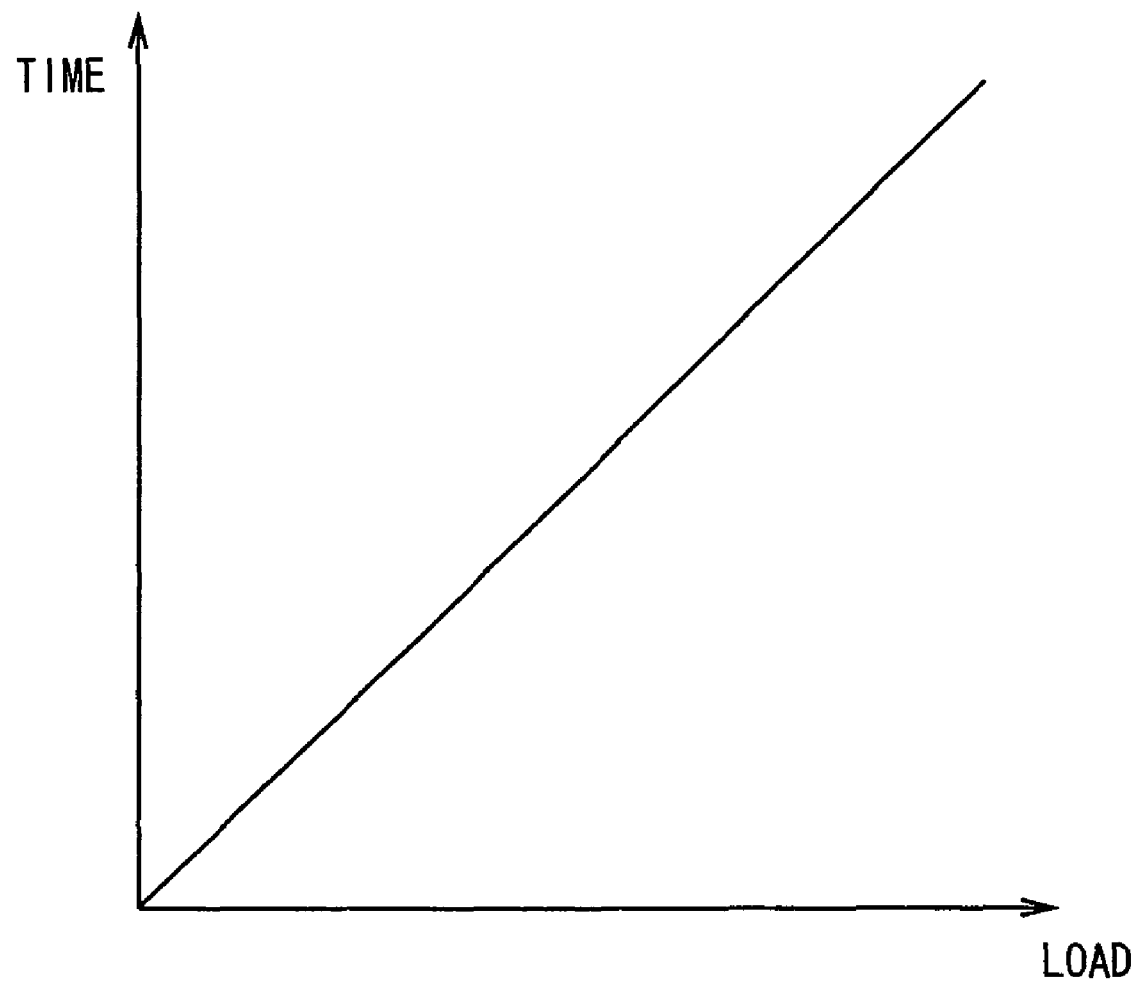
FIG. 9 is a schematic diagram showing relationship between a load and a polling interval.

With reference to sequence charts in FIGS. 8 and 9, the following describes how an associated information provision server KS controls polling intervals by specifying timing to receive an acquisition request for musical composition information from a client terminal CT.

(1-8-1) Polling Interval Control Sequence with a Delay Time Specified

At step SP1 as shown in FIG. 8, the radio station RS starts broadcasting musical composition A in a current program, and then proceeds to the next step SP2.

At step SP2, after starting broadcasting musical composition A, the radio station RS notifies the associated information provision server KS that musical composition A has started being broadcast.

At step SP11, the associated information provision server KS uses the musical composition information database 93 (FIG. 4) to maintain a database of musical composition information associated with a plurality of types of musical compositions. More specifically, the musical composition information includes titles and artist names concerning a plurality of types of musical compositions, names and numbers of CDs that record the corresponding musical compositions, and the like. It is necessary to provide the client terminal CT with musical composition information associated with musical composition A notified from the radio station RS. For this purpose, the associated information provision server KS updates the previous musical composition information to musical composition information associated with musical composition A, and then proceeds to the next step SP12.

At step SP21, the client terminal CT receives musical composition A broadcast by the radio station RS at step SP1 so that the user can listen to it. At step SP22, the client terminal CT performs polling by transmitting an acquisition request for the musical composition information to the associated information provision server KS at an interval of 30 seconds. The musical composition information includes titles and artist names associated with musical composition A. The client terminal CT then proceeds to the next step SP23.

The associated information provision server KS manages the number of accesses concerning acquisition requests for musical composition information issued from a plurality of client terminals CT. At step SP12, the associated information provision server KS determines whether or not the number of accesses exceeds a specified threshold.

If the result is negative, an excess load is not applied to the control section 90 of the associated information provision server KS. This also indicates that the network is not subject to excess traffic that may be caused by concentrated acquisition requests for the musical composition information. In this case, the associated information provision server KS proceeds to the next step SP13.

At step SP13, it is determined that an excess load is not applied to the control section 90 or the network is not subject to excess traffic. In response to the acquisition request from the client terminal CT, the associated information provision server KS provides the client terminal CT with the musical composition information about musical composition A via the network 2. This information is prepared to be supplied next.

On the contrary, if the result is affirmative at step SP12, an excess load is applied to the control section 90 of the associated information provision server KS. This also indicates that the network is subject to excess traffic due to concentrated acquisition requests for the musical composition information. In this case, the associated information provision server KS proceeds to the next step SP14.

At step SP14, the associated information provision server KS provides the client terminal CT with the musical composition information about musical composition A via the network 2. This information is prepared to be supplied next. In addition, the associated information provision server KS specifies n seconds after which the client terminal CT should transmit the next acquisition request for the musical composition information, where n is not 30 specified as the normal request timing.

At step SP23, the client terminal CT acquires the musical composition information from the associated information provision server KS. Further, the client terminal CT requests to acquire the musical composition information at the request timing n seconds later. This timing is longer than the normal 30-second polling interval.

When the associated information provision server KS thereafter specifies the next request timing, the client terminal CT requests to acquire the musical composition information at the request timing of n seconds later. When the next request timing is not specified, the client terminal CT requests to acquire the musical composition information at the normal interval of 30 seconds.

As shown in FIG. 9, the associated information provision server KS may identify that an excess load is applied to the control section 90 due to concentrated acquisition requests from a plurality of client terminals CT. In this case, the associated information provision server KS specifies a given delay time (n seconds later) after which the client terminal CT should transmit an acquisition request for the musical composition information. This causes a deviation from the polling interval for the other client terminals CT to prevent excess traffic on the network.

As acquisition requests from the client terminals CT concentrate to increase load on the control section 90, the associated information provision server KS gradually prolongs the delay time (n seconds) for the request timing after which the client terminal CT should issue an acquisition request for the musical composition information. In this manner, the associated information provision server KS prevents load on the control section 90 from exceeding a specified threshold.

After the control section 90 is loaded excessively, the associated information provision server KS may specify different delay times (n seconds) for the respective client terminals CT. Alternatively, the associated information provision server KS may specify the same delay time (n seconds) for the client terminals CT issuing acquisition requests after the control section 90 is loaded excessively.

(1-8-2) Polling Interval Control Sequence with the Time Specified

Figure 10:
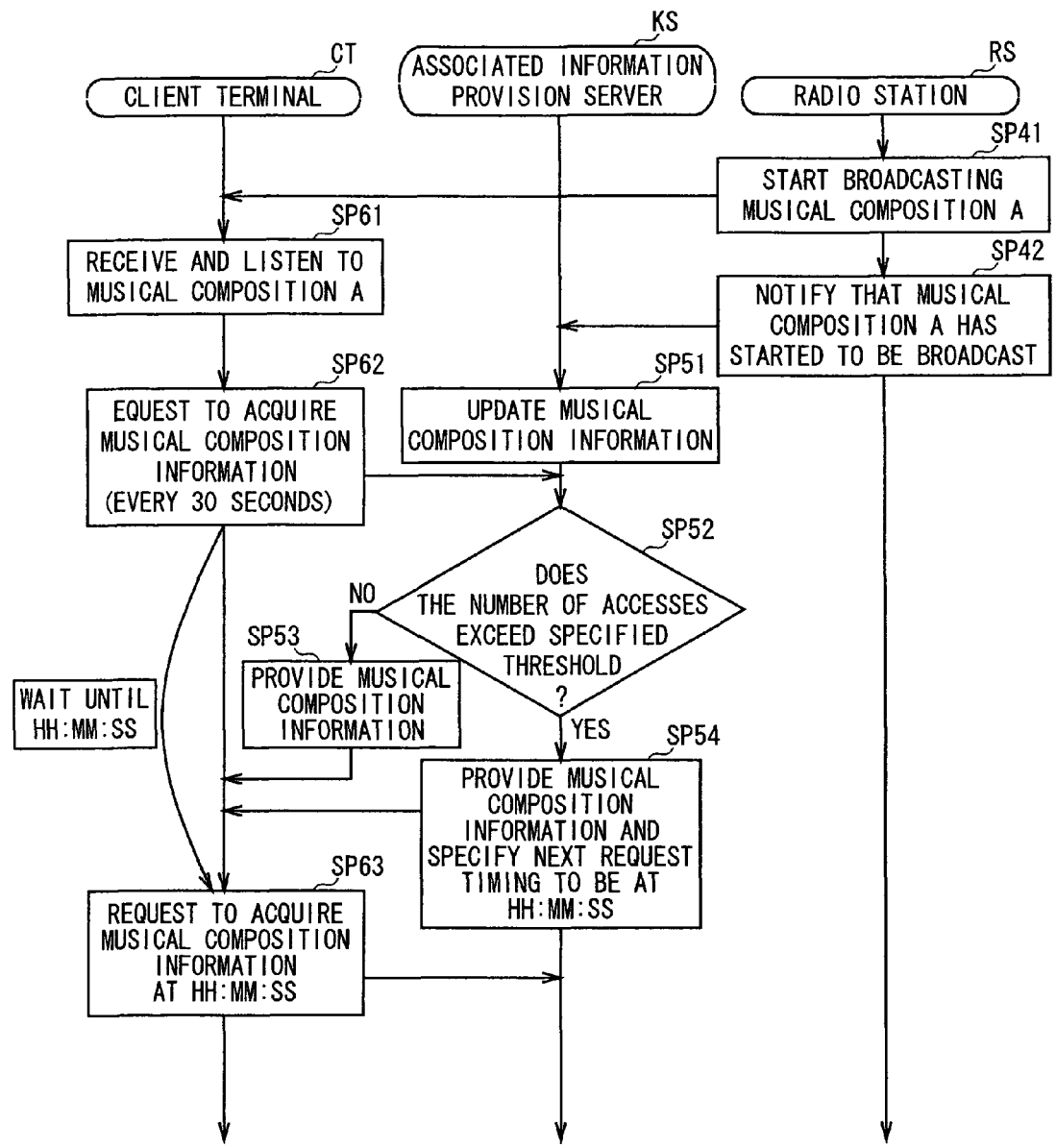
FIG. 10 is a schematic diagram showing a polling interval control sequence with a time specified.

At step SP41 as shown in FIG. 10, the radio station RS starts broadcasting musical composition A in the current program, and then proceeds to the next step SP42.

At step SP42, after starting broadcasting musical composition A, the radio station RS notifies the associated information provision server KS that musical composition A has started being broadcast.

At step SP51, the associated information provision server KS uses the musical composition information database 93 (FIG. 4) to maintain a database of musical composition information associated with a plurality of types of musical compositions. It is necessary to provide the client terminal CT with musical composition information associated with musical composition A notified from the radio station RS. For this purpose, the associated information provision server KS updates the previous musical composition information to musical composition information associated with musical composition A, and then proceeds to the next step SP52.

At step SP61, the client terminal CT receives musical composition A broadcast by the radio station RS at step SP1 so that the user can listen to it. At step SP62, the client terminal CT performs polling by transmitting an acquisition request for the musical composition information to the associated information provision server KS at an interval of 30 seconds. The musical composition information includes titles and artist names associated with musical composition A. The client terminal CT then proceeds to the next step SP63.

The associated information provision server KS manages the number of accesses concerning acquisition requests for musical composition information issued from a plurality of client terminals CT. At step SP52, the associated information provision server KS determines whether or not the number of accesses exceeds a specified threshold.

If the result is negative, an excess load is not applied to the control section 90 of the associated information provision server KS. This also indicates that the network is not subject to excess traffic that may be caused by concentrated acquisition requests for the musical composition information. In this case, the associated information provision server KS proceeds to the next step SP53.

At step SP53, it is determined that an excess load is not applied to the control section 90 or the network is not subject to excess traffic. In response to the acquisition request from the client terminal CT, the associated information provision server KS provides the client terminal CT with the musical composition information about musical composition A via the network 2. This information is prepared to be supplied next.

On the contrary, if the result is affirmative at step SP52, an excess load is applied to the control section 90 of the associated information provision server KS. This also indicates that the network is subject to excess traffic due to concentrated acquisition requests for the musical composition information. In this case, the associated information provision server KS proceeds to the next step SP54.

At step SP54, the associated information provision server KS provides the client terminal CT with the musical composition information about musical composition A via the network 2. This information is prepared to be supplied next. In addition, the associated information provision server KS specifies time "hh:mm:ss" at which the client terminal CT should transmit the next acquisition request for the musical composition information, In this example, hh corresponds to hour, mm to minute, and ss to second. The specified time is longer than the normal polling interval.

At step SP23, the client terminal CT acquires the musical composition information from the associated information provision server KS. Further, the client terminal CT keeps the time based on its own clock until time "hh:mm:ss" as the request timing specified from the associated information provision server KS. At the specified time "hh:mm:ss", the client terminal CT requests to acquire the musical composition information.

Thereafter, the associated information provision server KS may specify the next time for request timing. At the specified time, the client terminal CT requests to acquire the musical composition information. When no time is specified for the next request timing, the client terminal CT requests to acquire the musical composition information at the normal 30-second interval.

Figure 11:
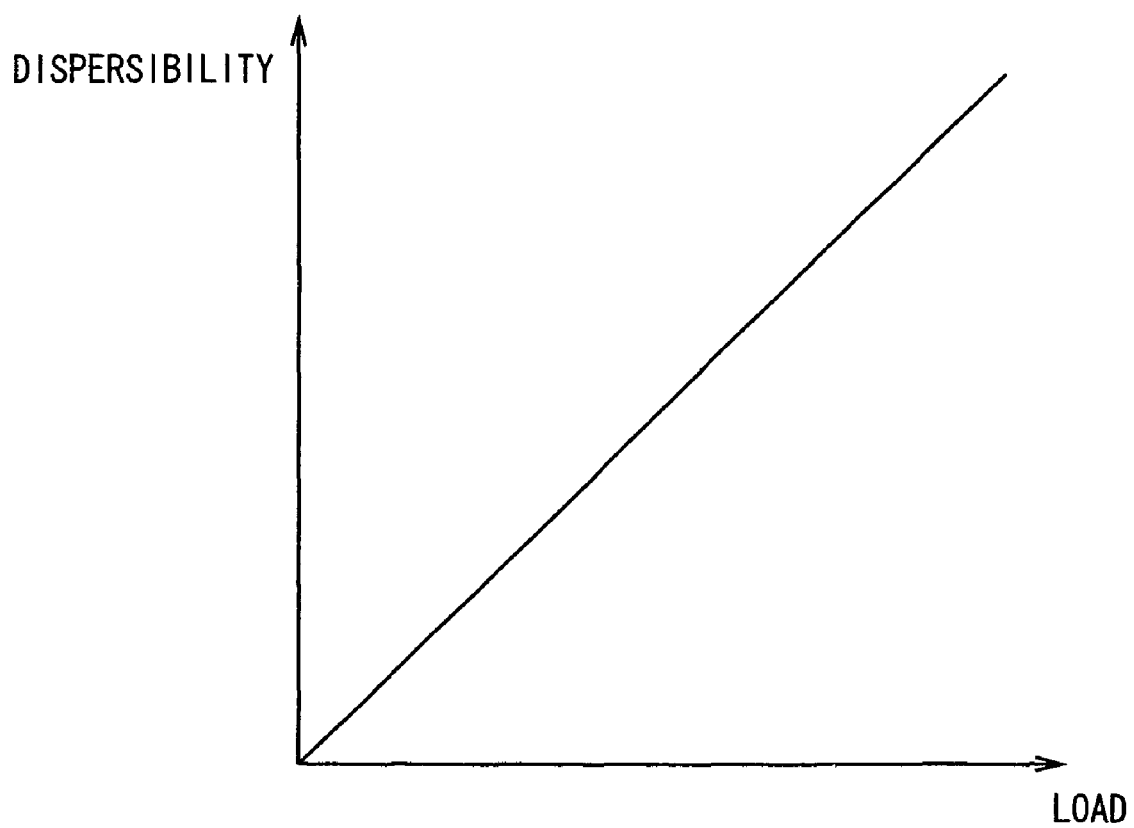
FIG. 11 is a schematic diagram showing relationship between a load and dispersibility of polling intervals.

As shown in FIG. 11, the associated information provision server KS may identify that an excess load is applied to the control section 90 due to concentrated acquisition requests from a plurality of client terminals CT. In this case, the associated information provision server KS specifies a time for the request timing at which the client terminal CT should transmit an acquisition request for the musical composition information. This disperses polling intervals by causing a deviation from the polling interval for the other client terminals CT to prevent excess traffic on the network.

As acquisition requests from the plurality of client terminals CT concentrate to increase load on the control section 90, the associated information provision server KS delays the time for the request timing at which the client terminal CT should issue an acquisition request for the musical composition information. In this manner, the associated information provision server KS prevents load on the control section 90 from exceeding a specified threshold.

After the control section 90 is loaded excessively, the associated information provision server KS may specify different times as request timings for the respective client terminals CT. Alternatively, the associated information provision server KS may specify the same time as request timing for the client terminals CT issuing acquisition requests after the control section 90 is loaded excessively.

(1-9) Operations and Effects According to the First Embodiment

According to the above-mentioned configuration, the associated information provision server KS of the information provision system 1 may not be congested with acquisition requests from the plurality of client terminals CT. The load on the control section 90 may be below the specified threshold. In such case, the associated information provision server KS responds to an acquisition request for musical composition information from the client terminal CT and provides the musical composition information to the client terminal CT.

Thereafter, the associated information provision server KS may be congested with acquisition requests from the plurality of client terminals CT. The load on the control section 90 may exceed the specified threshold. In such case, the associated information provision server KS immediately specifies the delay or the time so as to cause a difference between the normal polling interval and the request timing at which the client terminal CT should request to acquire the musical composition information.

A plurality of client terminals CT request to acquire musical composition information from the associated information provision server KS. Some client terminals CT are assigned the delay or the time specified by the associated information provision server KS, and others are not. Since these client terminals CT are mixed, the associated information provision server KS is not congested with acquisition requests for musical composition information at the same time.

The associated information provision server KS just needs to specify the delay or the time for the client terminal CT. Thereafter, there is no need for complicated processes such as managing schedules to provide musical composition information to the plurality of client terminals CT. It is possible to prevent excess traffic on the network without giving unnecessary load on the control section 90.

There may be a plurality of client terminals CT assigned with the delay or the time. In such case, the respective client terminals CT use clocks to keep the delay or the time. The clocks may be not completely synchronized with each other. If the client terminals CT simultaneously access the associated information provision server KS after the specified delay or at the specified time, concentrated accesses do not occur at the completely corresponding timing.

In this manner, the associated information provision server KS specifies the delay or the time in consideration for asynchronization between a plurality of client terminals CT. Accordingly, a simple process of specifying the delay or the time can avoid concentrated accesses and reliably prevent excess traffic on the network.

According to the above-mentioned configuration, the associated information provision server KS in the information provision system 1 can provide the simple method of preventing excess traffic on the network almost simultaneously concentrated acquisition requests for musical composition information from a plurality of client terminals CT. The associated information provision server KS can promptly provide the musical composition information to the client terminal CT that issued the acquisition request.

(2) Second Embodiment

The following describes the service system as a second embodiment in which the above-mentioned associated information provision server KS comprises one of a plurality of service servers.

The second embodiment employs the same control method for polling intervals as that described in the above-mentioned first embodiment (FIGS. 8 and 10) and the description is omitted. In the second embodiment, the decryption about steps SP1078 through SP1082 in FIG. 23 to be described later corresponds to the description of the appended claims.

Figure 12:
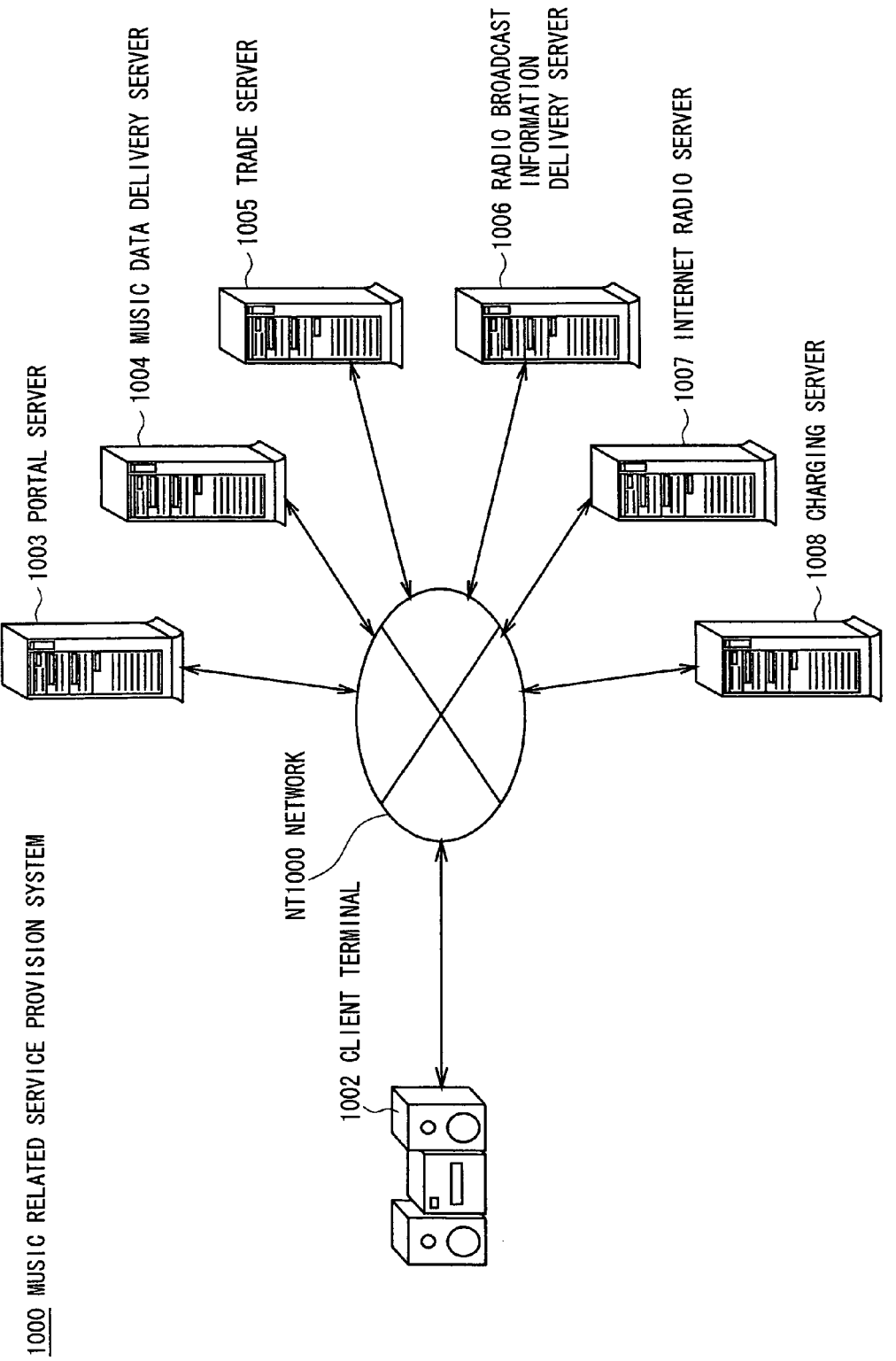
FIG. 12 is a schematic diagram showing the overall configuration of a music related service provision system according to a second embodiment.

With respect to the second embodiment, a client terminal 1002 in FIG. 12 corresponds to the client terminal CT in FIG. 1 according to the first embodiment. A portal server 1003 in FIG. 12 corresponds to URL provision server 3 in FIG. 1. A radio broadcast information delivery server 1006 in FIG. 12 corresponds to the associated information provision server KS in FIG. 1. A network NT1000 in FIG. 12 corresponds to the Internet 2 in FIG. 1.

Further, the service system according to the second embodiment is assumed to have the single sign-on function.

(2-1) System Configuration

FIG. 12 shows an overview of a music related service provision system 1000 as the service system according to the second embodiment. The system 1000 comprises a client terminal 1002 and a plurality of service servers. The client terminal 1002 belongs to a user who makes a contract with a service provider of the music related service provision system 1000. The service servers include: a portal server 1003 to manage the client terminal 1002; and the other servers 1004 through 1008 to provide the client terminal 1002 with various services related to the music.

According to this embodiment, the music data delivery server 1004 provides music data delivery services to deliver music data as content data to the client terminal 1002. The content data complies with such formats as ATRAC3 (Adaptive Transform Acoustic Coding 3), AAC (Advanced Audio Coding), WMA (Windows Media Audio), RealAUDIO G2 Music Codec, and MP3 (MPEG Audio Layer-3).

A trade server 1005 provides trade services to sell CD (Compact Disc), DVD (Digital Versatile Disc), and the like to the user via the client terminal 1002.

Further, the radio broadcast information delivery server 1006 provides radio broadcast information delivery services to deliver radio broadcast information to the client terminal 1002. Specifically, the radio broadcast information includes radio programs, music, and the like broadcasted from a radio station.

The Internet radio server 1007 provides Internet radio broadcast services to broadcast radio broadcast data to the client terminal 1002 via the network NT1000 equivalent to the Internet. The radio broadcast data is delivered in streaming format.

In addition, a charging server 1008 performs a charging process to charge users for various fees in response to requests from the portal server 1003 and the like.

(2-2) Functional Circuit Block Configuration of the Client Terminal

Figure 13:
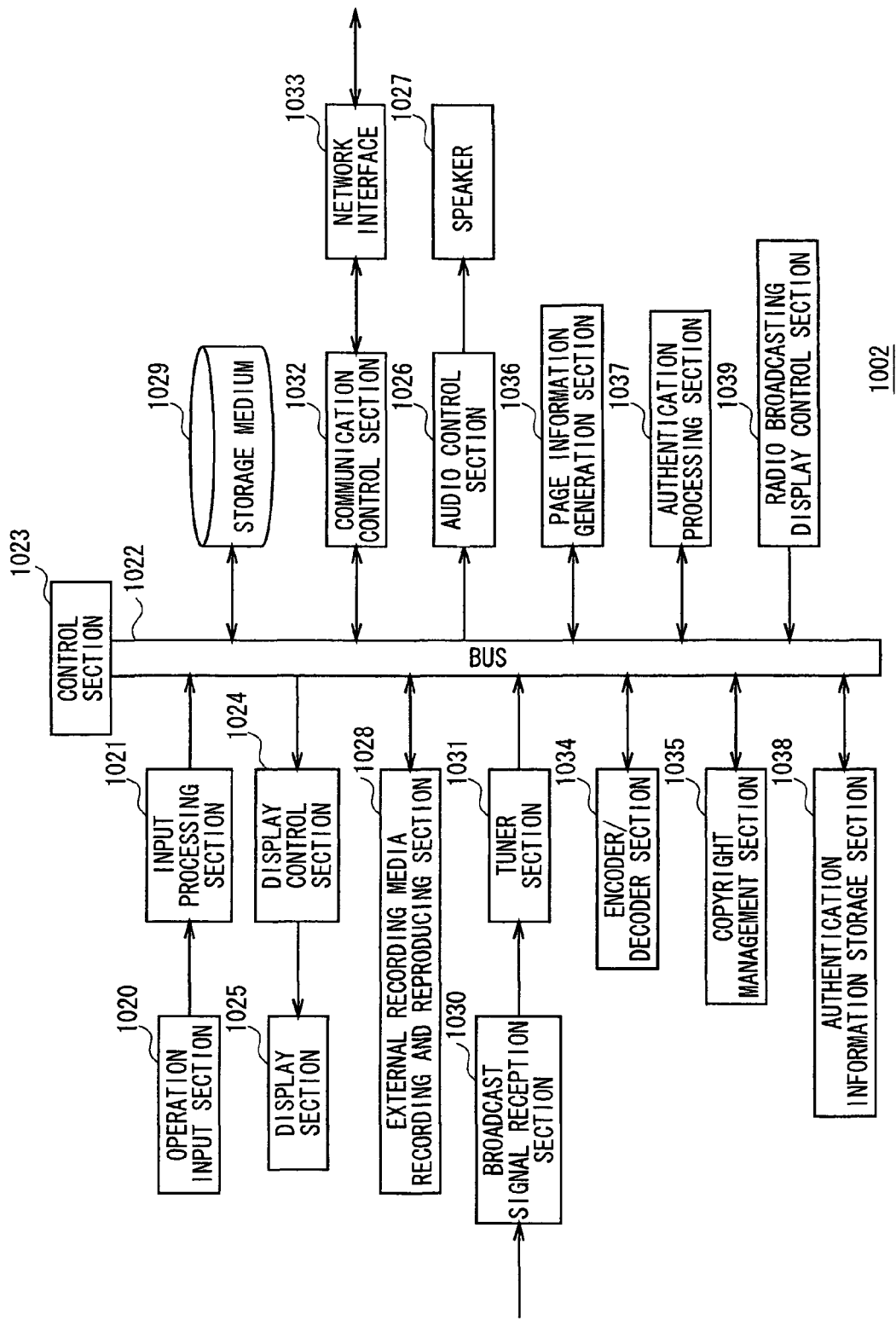
FIG. 13 is a block diagram showing hardware configuration of a client terminal using functional circuit blocks.

The following describes the hardware configuration of the client terminal 1002 using functional circuit blocks. As shown in FIG. 13, the client terminal 1002 has an operation input section 1020 comprising various operation buttons provided on the surface of the client terminal cabinet or a remote controller (not shown). When a user operates the operation input section 1020, it detects the user operation and sends an input operation signal corresponding to the operation to an input processing section 1021.

The input processing section 1021 is supplied with the input operation signal from the operation input section 1020, converts the signal into a specific operation command, and sends it to a control section 1023 via a bus 1022.

The control section 1023 is supplied with operation commands and control signals from circuits connected to the bus 1022. Based on these operation commands and control signals, the control section 1023 controls operations of these circuits.

A display control section 1024 is supplied with video data via the bus 1022 and applies digital-analog conversion to the video data to generate an analog video signal. The display control section 1024 sends the resulting analog video signal to a display section 1025.

The display section 1025 represents a display device such as a liquid crystal display and may be directly attached to the surface of the main unit cabinet or may be externally connected.

The display section 1025 is supplied with processing results from the control section 1023 and various video data as an analog video signal via the display control section 1024. The display section 1025 displays a video based on the analog video signal.

An audio control section 1026 applies digital-analog conversion to audio data supplied via the bus 1022 and sends a resulting analog audio signal to a speaker 1027. The speaker 1027 outputs audio based on the analog audio signal supplied from the audio control section 1026.

An external recording media recording and reproducing section 1028 reads and reproduces content data from external recording media such as CDs and Memory Stick (registered trademark), and records targeted content data on the external recording media. Memory Stick comprises flash memory enclosed in a packaging case.

The external recording media recording and reproducing section 1028 reads video data as content data from an external recording medium and supplies the read video data to the display control section 1024 via the bus 1022.

The display control section 1024 is supplied with the video data read as content data from the external recording medium by the external recording media recording and reproducing section 1028. The display control section 1024 then converts the video data into an analog video signal and sends it to the display section 1025.

The external recording media recording and reproducing section 1028 reads audio data as content data from the external recording medium and supplies the read audio data to the audio control section 1026 via the bus 1022.

When the external recording media recording and reproducing section 1028 reads audio data as content data from the external recording medium, the audio control section 1026 converts the audio data into an analog audio signal and supplies it to the speaker 1027.

When the external recording media recording and reproducing section 1028 reads the content data from the external recording medium, the control section 1023 sends that content data to a storage medium 1029 in the client terminal 1002 via the bus 1022. The control section 1023 can store the content data in the storage medium 1029. Storing content data in the storage medium 1029 is also referred to as ripping.

When reading video data such as image data as content data from the storage medium 1029, the control section 1023 supplies the read video data to the display control section 1024 via the bus 1022.

When reading audio data as content data from the storage medium 1029, the control section 1023 supplies the read audio data to the audio control section 1026 via the bus 1022.

In addition, the control section 1023 can read music data from the storage medium 1029 and transfers it to the external recording media recording and reproducing section 1028 which can then record the music data on the external recording medium.

A broadcast signal reception section 1030 receives radio broadcasting waves transmitted from radio stations and supplies them to the tuner section 1031.

As mentioned above, the broadcast signal reception section 1030 receives radio broadcasting waves. Under the control of the control section 1023, the tuner section 1031 extracts such radio broadcasting signals from the received radio broadcasting waves as to have a broadcasting frequency corresponding to the radio station specified from the operation input section 1020, for example. The tuner section 1031 then applies specified reception processing to the extracted signals. The tuner section 1031 sends resulting audio data to the audio control section 1026 via the bus 1022.

The audio control section 1026 converts the audio data supplied from the tuner section 1031 into an analog audio signal and sends this signal to the speaker 1027. The speaker 1027 outputs the audio of the radio program broadcast from the radio station. In this manner, the user can listen to the radio program's audio.

The control section 1023 can record audio of radio programs. To do this, the control section 1023 sends audio data acquired by the tuner section 1031 to the storage medium 1029 for storage.

Further, the control section 1023 can connect to a network NT1000 via a communication control section 1032 and a network interface 1033 in order. Consequently, the control section 1023 can access the portal server 1003, and the other servers 1004 through 1007 on the network NT1000. In this manner, the client terminal can interchange various information and data with the portal server 1003, and the other servers 1004 through 1007, and the like.

Compressed and encoded content data is received from the network NT1000 via the network interface 1033 and the communication control section 1032 in order. Alternatively, compressed and encoded content data is read from the storage medium 1029 and external recording media. An encoder/decoder section 1034 decodes such content data and sends it to the display control section 1024 or the audio control section 1026.

Further, the encoder/decoder section 1034 compresses and encodes neither compressed nor encoded content data read from external recording media or audio data supplied from the tuner section 1031. The encoder/decoder section 1034 sends the compressed and encoded content data to the storage medium 1029.

Under the control of the control section 1023, content data is compressed and encoded in the encoder/decoder section 1034 and is stored in the storage medium 1029.

A copyright management section 1035 generates copyright management information corresponding to content data that is downloaded from the network NT1000 via the network interface 1033 and the communication control section 1032 in order or is read from external recording media by the external recording media recording and reproducing section 1028.

Under the control of the control section 1023, the copyright management information generated in the copyright management section 1035 is associated with the content data and is registered to the recording medium 1029.

The copyright management section 1035 is used to check out content data associated with the copyright management information from the storage medium 1029 to a specific external recording medium and to check in the content data associated with the copyright management information from the specific external recording medium to the storage medium 1029. The copyright management section 1035 appropriately updates contents of the copyright management information corresponding to the content data to protect the copyright of the content data.

The client terminal receives XML (eXtensible Markup Language) or HTML (Hyper Text Markup Language) files from the network NT1000 via the network interface 1033 and the communication control section 1032 in order. A page information generation section 1036 interprets page information of these files and generates video data to be displayed on the display section 1025. The page information generation section 1036 then sends the generated video data to the display control section 1024.

An authentication processing section 1037 performs authentication processes such as sending authentication information to the portal server 1003 and the other servers 1004 through 1007 on the network NT1000 connected via the network interface 1033, via the communication control section 1032 and the network interface 1033 in order.

An authentication information storage section 1038 stores authentication information needed for the authentication processing section 1037 to access the portal server 1003, the other servers 1004 through 1007, and the like.

A radio broadcasting display control section 1039 sends a request signal to the radio broadcast information delivery server 1006 via the communication control section 1032 and the network interface 1033 in order. This request signal is used to request information about the radio broadcast currently received by the user for listening. The radio broadcast information delivery server 1006 corresponds to the radio station that carries the radio broadcast being received.

As a result, the radio broadcasting display control section 1039 receives the radio broadcast information received from the radio broadcast information delivery server 1006 on the network NT1000 via the network interface 1033 and the communication control section 1032 in order. In addition, the radio broadcasting display control section 1039 sends the received radio broadcast information to the display control section 1024. This allows the display section 1025 to display the radio broadcast information (equivalent to the associated information in the first embodiment) comprising a name of the currently received radio program, a title and an artist name of the currently received musical composition, and the like.

(2-3) Portal Server Configuration

Figure 14:
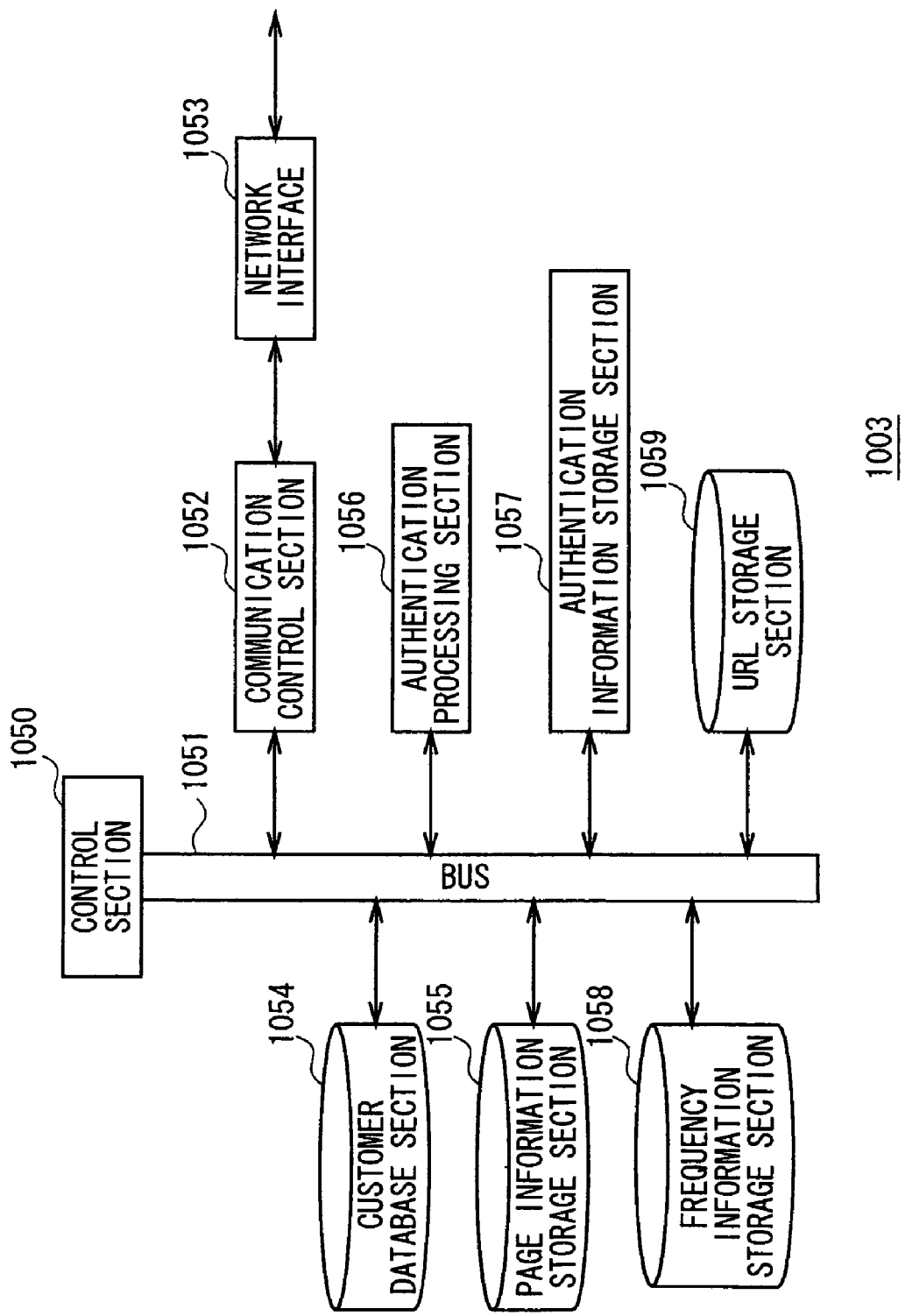
FIG. 14 is a block diagram showing hardware configuration of a portal server using functional circuit blocks.

With reference to FIG. 14, the following describes the hardware configuration of the portal server 1003 as authentication server using functional circuit blocks. A control section 1050 in the portal server 1003 controls operations of circuits connected via a bus 1051.

Under the control of the control section 1050, a communication control section 1052 interchanges various information with the client terminal 1002, the other servers 1004 through 1007, and the like via a network interface 1053.

A customer database section 1054 registers customer information comprising user ID (identification) information and associated password information of a user who has completed a contract with a service provider of a music related service provision system.

A page information storage section 1055 stores page information and the like managed by the music related service provision system's service provider.

The page information is written in languages such as XML and includes URL (Uniform Resource Locator) information to access a music data delivery server 1004, a trade server 1005, a video broadcast information delivery server 1006, an Internet radio server 1007 and the like.

An authentication processing section 1056 receives the user ID information and the password information sent from the client terminal 1002 via the network interface 1053 and the communication control section 1052 in order. The authentication processing section 1056 then performs a user authentication process to confirm whether or not the customer database section 1054 stores the received user ID information and password information as the customer information.

Upon completion of the user authentication process, the authentication processing section 1056 issues portal authentication result information (authentication session ID information to be described later) indicating the result of the user authentication process. The authentication processing section 1056 temporarily stores the issued portal authentication result information in the authentication information storage section 1057.

Let us assume that the user is authenticated to be a registered user as a result of the user authentication process by the authentication processing section 1056. In this case, the control section 1050 sends page information about a contractor page stored in the page information storage section 1055 as well as the portal authentication result information to the client terminal 1002 via the communication control section 1052 and the network interface 1053 in order.

Next, let us assume that the user is not authenticated to be a registered user as a result of the user authentication process by the authentication processing section 1056. In this case, the control section 1050 may be configured to send authentication error information as well as unsuccessful authentication notification page information indicating the unsuccessful authentication to the client terminal 1002 via the communication control section 1052 and the network interface 1053 in order. The unsuccessful authentication notification page information is stored in the page information storage section 1055.

As a result of performing authentication processes for the user from the music data delivery server 1004, the trade server 1005, the radio broadcast information delivery server 1006 and the like, the authentication processing section 1056 receives portal authentication result information (authentication ticket to be described later) via the network interface 1053 and the communication control section 1052 in order. The portal authentication result information is acquired and sent from the user's client terminal 1002. Then, the authentication processing section 1056 compares the received portal authentication result information with the portal authentication result information that is temporarily stored in the authentication information storage section 1057 corresponding to the user.

The authentication processing section 1056 performs a confirmation process as an authentication process for the portal authentication result information received from the music data delivery server 1004, the trade server 1005, the radio broadcast information delivery server 1006 and the like. Specifically, the authentication processing section 1056 confirms whether or not the portal authentication result information is authenticated. The authentication processing section 1056 then returns confirmation result information indicating a confirmation result to the music data delivery server 1004, the trade server 1005, the radio broadcast information delivery server 1006 and the like via the communication control section 1052 and the network interface 1053 in order.

A frequency information storage section 1058 stores the following associated with each other: an area code such as a postal guide number capable of specifying an area; frequency information indicating broadcast frequencies for radio broadcasts receivable in the area indicated by the area code; a name of a radio station (hereafter referred to as a radio station name) to broadcast the radio broadcast; and a call sign as identification information unique to each radio station.

A URL storage section 1059 stores the following associated with each other: a call sign for radio broadcast corresponding to each radio station; and URL information capable of acquiring radio broadcast information (hereafter referred to specifically as now-on-air information). This information concerns a currently broadcast radio program provided by the radio station corresponding to the call sign and comprises a name of the radio program, a title of the musical composition currently broadcast in the radio program, and the like.

(2-4) Functional Circuit Block Configuration of the Music Data Delivery Server

Figure 15:
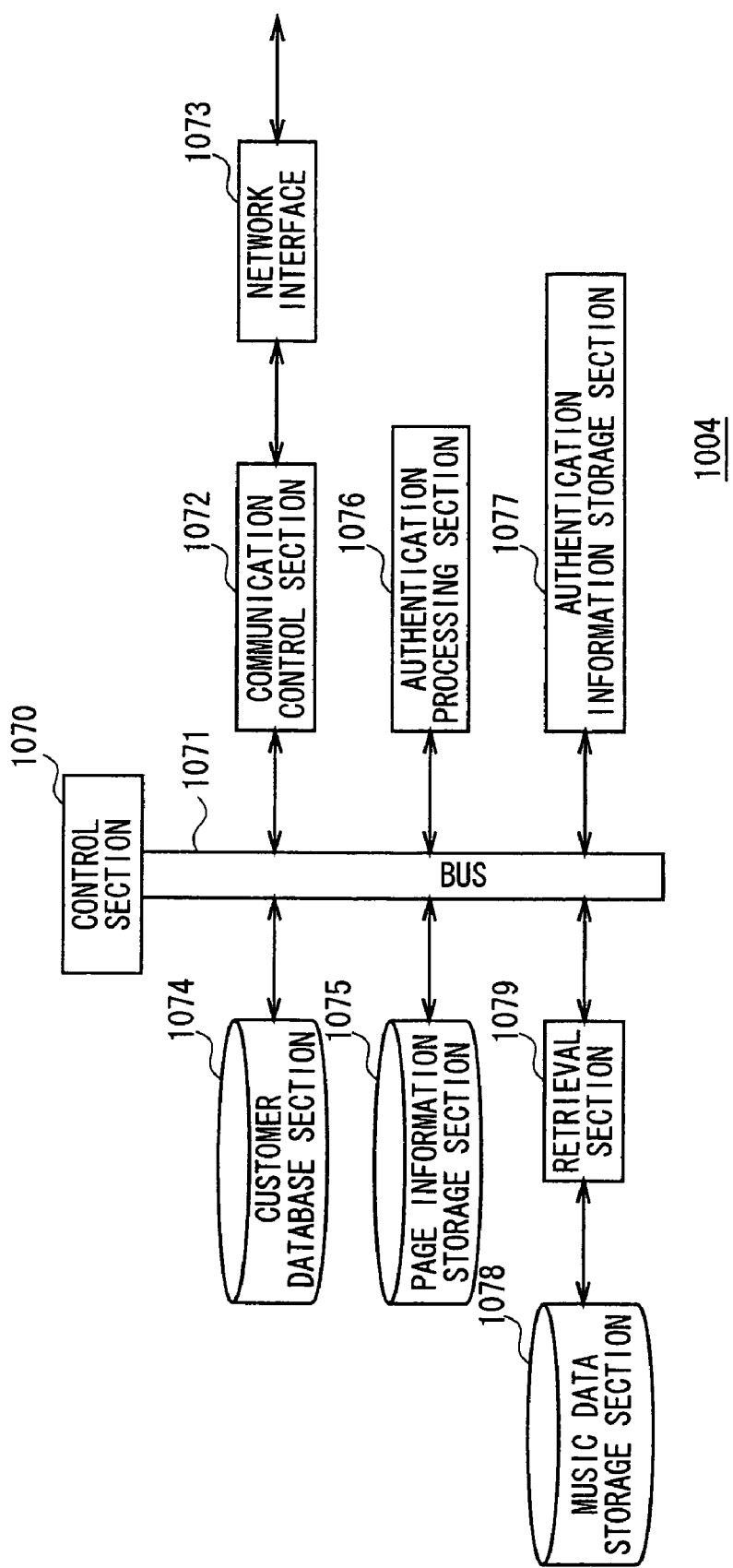
FIG. 15 is a block diagram showing hardware configuration of a music data delivery server using functional circuit blocks.

Referring now to FIG. 15, the following describes the hardware configuration of the music data delivery server 1004 using functional circuit blocks. A control section 1070 in the music data delivery server 1004 controls operations of circuits connected via a bus 1071.

Under control of the control section 1070, a communication control section 1072 interchanges various information and data such as content data with the client terminal 1002, the portal server 1003, and the like via a network interface 1073.

A customer database section 1074 stores customer information comprising a corresponding combination of user ID information and password information about users who have completed contracts with a service provider of the music data delivery server 1004. An authentication processing section 1075 may have a function to authenticate users based on portal authentication result information that is issued by the portal server 1003 and is transmitted from the client terminal 1002. In such case, the customer database section 1074 may be omitted.

A page information storage section 1076 stores information such as page information about music data delivery pages for presenting downloadable music data. The music data delivery server 1004 manages this information.

The page information about music data delivery pages is written in languages such as XML. This enables a user of the client terminal 1002 to select intended music data to be downloaded.

The control section 1070 receives a page information acquisition request signal transmitted from the client terminal 1002 via the network interface 1073 and the communication control section 1072 in order. The page information acquisition request signal requests page information about music data delivery pages. According to the received page information acquisition request signal, the control section 1070 transmits the page information about music data delivery pages to the client terminal 1002 via the communication control section 1072 and the network interface 1073 in order. The page information about music data delivery pages is stored in the page information storage section 1076.

The authentication processing section 1075 receives the user ID information and the password information about the user of the client terminal 1002 from it via the network interface 1073 and the communication control section 1072 in order. The authentication processing section 1075 then performs a user authentication process to confirm whether or not the customer database section 1074 stores the received user ID information and password information as the customer information.

Further, the authentication processing section 1075 uses a user authentication technique that differs from the user authentication process using the user ID information and the password information. That is to say, the authentication processing section 1075 receives portal authentication result information (authentication ticket to be described later) that is issued by the portal server 1003 and is transmitted from the client terminal 1002 via the network interface 1073 and the communication control section 1072 in order. The authentication processing section 1075 then transmits the received portal authentication result information to the portal server 1003 via the communication control section 1072 and the network interface 1073 in order.

In response to the portal authentication result information transmitted to the portal server 1003, the authentication processing section 1075 receives confirmation result information via the network interface 1073 and the communication control section 1072 in order. The confirmation result information is returned from the portal server 1003 as a result of applying the authentication process (i.e., the above-mentioned confirmation process) to the portal authentication result information. Based on the received confirmation result information, the authentication processing section 1075 confirms whether or not the user is a registered user who completed a contract with the service provider of the music related service provision system 1000.

Upon completion of the user authentication process, the authentication processing section 1075 issues the server authentication result information (service session ID information to be described later) indicating the result of the user authentication process.

Let us assume that the user is authenticated to be a registered user as a result of the user authentication process by the authentication processing section 1075. In this case, the control section 1070 transmits page information as well as the server authentication result information to the client terminal 1002 via the communication control section 1072 and the network interface 1073 in order. The page information is related to a music data delivery page that is reserved for contractors and is stored in the page information storage section 1076.

By contrast, let us assume that the user is not authenticated to be a registered user as a result of the user authentication process by the authentication processing section 1075. In this case, the control section 1070 transmits authentication error information as well as unsuccessful authentication notification page information to the client terminal 1002 via the communication control section 1072 and the network interface 1073 in order. The unsuccessful authentication notification page information is stored in the page information storage section 1076 and indicates unsuccessful authentication.

The authentication information storage section 1077 temporarily stores server authentication result information issued by the authentication processing section 1075. The authentication information storage section 1077 also stores various types of authentication information needed for the authentication processing section 1075 to authenticate users who use the client terminal 1002.

A music data storage section 1078 stores a plurality of music data compressed and encoded in the above-mentioned formats such as ATRAC3 and MP3. The music data are associated with retrieval keys such as content ID information.

As mentioned above, the control section 1070 transmits the page information about the music data delivery page to the client terminal 1002. As a result, the client terminal 1002 transmits a download request signal that stores a retrieval key for retrieving music data intended for download and requests the download of intended music data. The music data delivery server 1004 receives the download request signal via the network interface 1073 and the communication control section 1072 in order. In this case, the retrieval section 1079 retrieves the corresponding retrieval key from the received download request signal.

Based on the retrieval key, the retrieval section 1079 searches a plurality of pieces of music data in the music data storage section 1078 for music data intended for download, i.e., one matching a retrieval condition indicated by the retrieval key.

The control section 1070 then transmits the retrieved music data intended for download to the client terminal 1002 via the communication control section 1072 and the network interface 1073 in order.

At this time, the control section 1070 transmits charging information to the charging server 1008 via the communication control section 1072 and the network interface 1073 in order. The charging information is used to charge the user who downloaded the music data to the client terminal 1002. In this manner, the control section 1070 allows the charging server 1008 to perform a charging process corresponding to the music data downloaded by the user.

(2-5) Functional Circuit Block Configuration of the Trade Server

Figure 16:
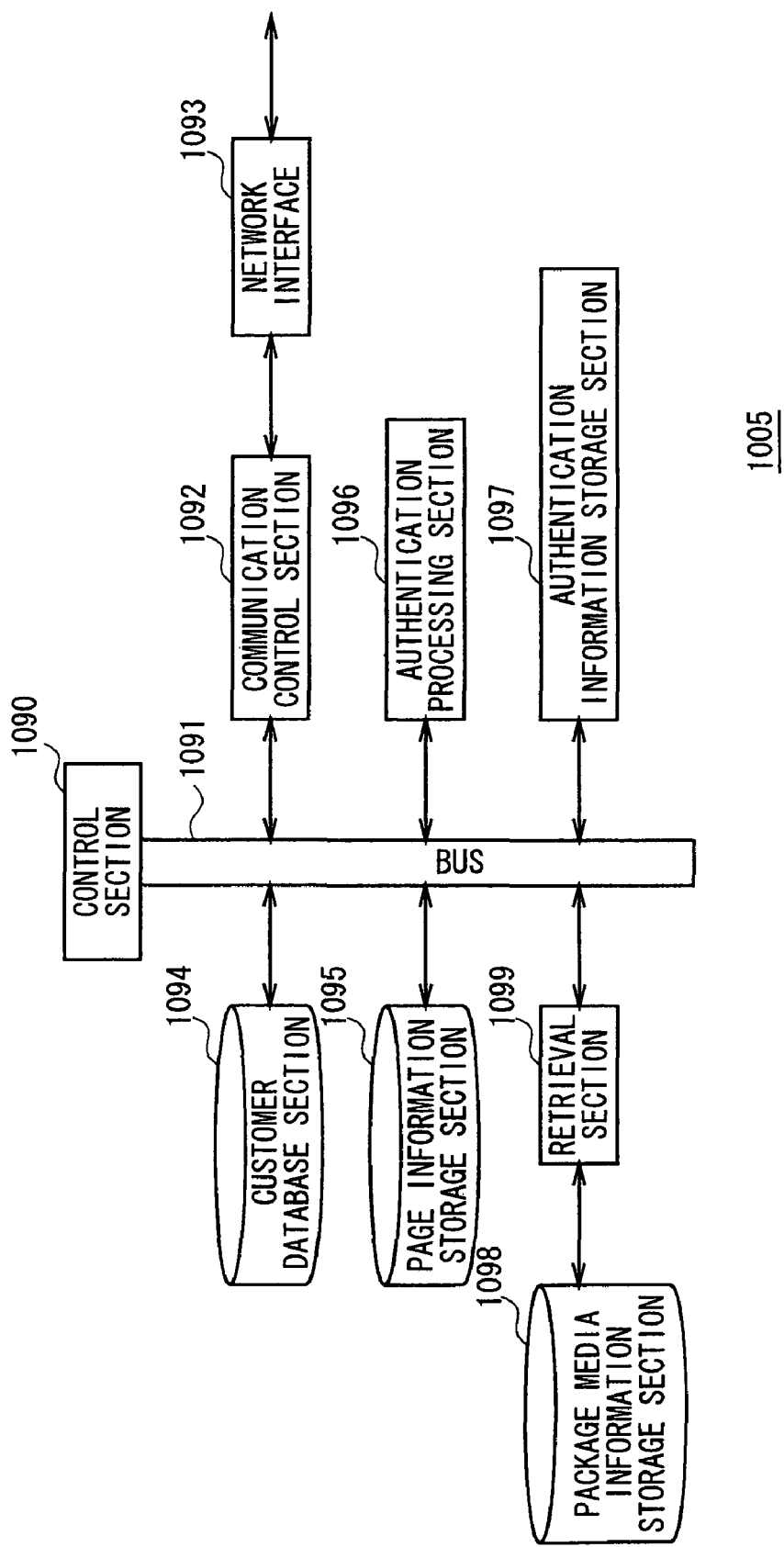
FIG. 16 is a block diagram showing hardware configuration of a trade server using functional circuit blocks.

Referring now to FIG. 16, the following describes the hardware configuration of the trade server 1005 using functional circuit blocks. A control section 1090 in the trade server 1005 controls operations of circuits connected via a bus 1091.

Under control of the control section 1090, a communication control section 1092 interchanges various information with the client terminal 1002, the portal server 1003, and the like via a network interface 1093.

A customer database section 1094 stores customer information comprising a corresponding combination of user ID information and password information about users who have completed contracts with a service provider of the trade server 1005. An authentication processing section 1095 may have a function to authenticate users based on portal authentication result information that is issued by the portal server 1003 and is transmitted from the client terminal 1002. In such case, the customer database section 1094 may be omitted.

A page information storage section 1096 stores information such as page information about package media sales pages for presenting package media such as CD and DVD for sale. The trade server 1005 manages this information.

The page information about package media sales pages is written in languages such as XML. This enables a user of the client terminal 1002 to select intended package media such as CD and DVD to be purchased.

The control section 1090 receives a page information acquisition request signal transmitted from the client terminal 1002 via the network interface 1093 and the communication control section 1092 in order. The page information acquisition request signal requests page information about package media sales pages. According to the received page information acquisition request signal, the control section 1090 transmits the page information about package media sales pages to the client terminal 1002 via the communication control section 1092 and the network interface 1093 in order. The page information about package media sales pages is stored in the page information storage section 1096.

The authentication processing section 1095 receives the user ID information and the password information about the user of the client terminal 1002 from it via the network interface 1093 and the communication control section 1092 in order. The authentication processing section 1095 then performs a user authentication process to confirm whether or not the customer database section 1094 stores the received user ID information and password information as the customer information.

Further, the authentication processing section 1095 uses a user authentication technique that differs from the user authentication process using the user ID information and the password information. That is to say, the authentication processing section 1095 receives portal authentication result information (authentication ticket to be described later) that is issued by the portal server 1003 and is transmitted from the client terminal 1002 via the network interface 1093 and the communication control section 1092 in order. The authentication processing section 1095 then transmits the received portal authentication result information to the portal server 1003 via the communication control section 1092 and the network interface 1093 in order.

In response to the portal authentication result information transmitted to the portal server 1003, the authentication processing section 1095 receives confirmation result information via the network interface 1093 and the communication control section 1092 in order. The confirmation result information is returned from the portal server 1003 as a result of applying the authentication process (i.e., the above-mentioned confirmation process) to the portal authentication result information. Based on the received confirmation result information, the authentication processing section 1095 confirms whether or not the user is a registered user who completed a contract with the service provider of the music related service provision system 1000.

Upon completion of the user authentication process, the authentication processing section 1095 issues the server authentication result information (service session ID information to be described later) indicating the result of the user authentication process.

Let us assume that the user is authenticated to be a registered user as a result of the user authentication process by the authentication processing section 1095. In this case, the control section 1090 transmits page information as well as the server authentication result information to the client terminal 1002 via the communication control section 1092 and the network interface 1093 in order. The page information is related to a package media sales page that is reserved for contractors and is stored in the page information storage section 1096.

By contrast, let us assume that the user is not authenticated to be a registered user as a result of the user authentication process by the authentication processing section 1095. In this case, the control section 1090 transmits authentication error information as well as unsuccessful authentication notification page information to the client terminal 1002 via the communication control section 1092 and the network interface 1093 in order. The unsuccessful authentication notification page information is stored in the page information storage section 1096 and indicates unsuccessful authentication.

The authentication information storage section 1097 temporarily stores server authentication result information issued by the authentication processing section 1095. The authentication information storage section 1097 also stores various types of authentication information needed for the authentication processing section 1095 to authenticate users who use the client terminal 1002.

A package media information storage section 1098 stores information (hereafter referred to as package media information) about a plurality of package media such as CD and DVD for sale. The package media information is associated with retrieval keys such as package media ID information.

As mentioned above, the control section 1090 transmits the page information about the package media sales page to the client terminal 1002. As a result, the client terminal 1002 transmits a media information request signal that requests package media information about a specific package medium such as CD and DVD. The media information request signal is received via the network interface 1093 and the communication control section 1092 in order. In this case, the retrieval section 1099 retrieves the corresponding retrieval key for retrieving the specific package medium from the received media information request signal.

Based on the retrieval key, the retrieval section 1099 searches a plurality of pieces of package media information in the package media information storage section 1098 for the package media information about the specific package medium, i.e., the information matching a retrieval condition indicated by the retrieval key.

The control section 1090 then transmits the retrieved package media information to the client terminal 1002 via the communication control section 1092 and the network interface 1093 in order. In this manner, the user is provided with the package media information about the specific package media.

As a result, the client terminal 1002 transmits a purchase request signal to request the purchase of the above-mentioned specific package medium. The control section 1090 receives the purchase request signal via the network interface 1093 and the communication control section 1092 in order. The control section 1090 then performs purchase processes such as shipping the specific package medium to the user of the client terminal 1002.

The control section 1090 transmits charging information to the charging server 1008 via the communication control section 1092 and the network interface 1093 in order. The charging information is used to charge the user who purchased the specific package medium. In this manner, the control section 1090 allows the charging server 1008 to perform a charging process corresponding to the user's purchase of the specific package medium.

When the charging server 1008 completes the charging process for the user, the control section 1090 transmits purchase completion information to the client terminal 1002 via the communication control section 1092 and the network interface 1093 in order. The purchase completion information indicates that the purchase of package media is complete.

Figure 17:
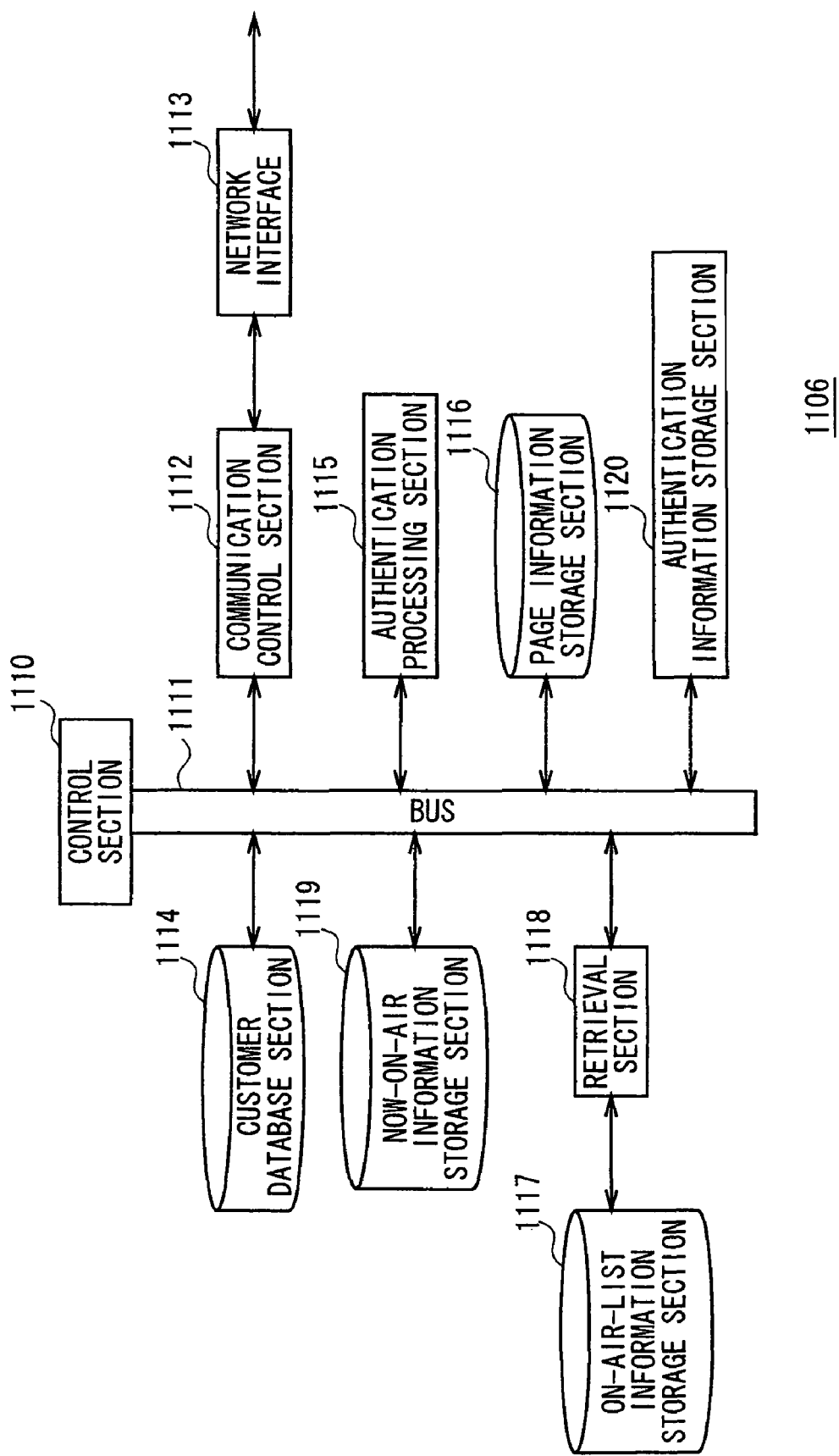
FIG. 17 is a block diagram showing hardware configuration of a radio broadcast information delivery server using functional circuit blocks.

(2-6) Functional Circuit Block Configuration of the Radio Broadcast Information Delivery Server With reference to FIG. 17, the following describes the hardware configuration of the radio broadcast information delivery server 1006, using functional circuit blocks. A control section 1110 in the radio broadcast information delivery server 1006 controls operations of circuits connected via a bus 1111.

Under the control of the control section 1110, a communication control section 1112 interchanges various information with the client terminal 1002, the portal server 1003, and the like via a network interface 1113.

A customer database section 1114 registers customer information comprising user ID information and associated password information of a user who has completed a contract with a service provider of the radio broadcast information delivery server 1006. The authentication processing section 1115 may have a function to authenticate users based on the portal authentication result information that is sent from the client terminal 1002 and is issued by the portal server 1003. In such case, the customer database section 1114 may not be provided.

There is provided radio broadcast information called on-air-list information. This information is managed by the radio broadcast information delivery server 1006 and concerns the radio program already broadcast by the radio station corresponding to the radio broadcast information delivery server 1006. A page information storage section 1116 stores, for example, page information about an on-air-list information delivery page used to acquire the on-air-list information.

Page information about the on-air-list information delivery page is written in a language such as XML. There is provided an input box or the like that allows a user of the client terminal 1002 to enter retrieval keys for intended on-air-list information. For example, retrieval keys include broadcast date information, names, and the like of radio programs.

An on-air-list information storage section 1117 stores the on-air-list information generated in a list format. The on-air-list information includes: the name of the radio program already broadcasted from the radio station corresponding to the radio broadcast information delivery server 1006; program broadcast start time, program broadcast end time, and the like; and title and artist name of a musical composition broadcasted in the radio program, musical composition broadcast start time, and the like.

The control section 1110 receives a page information acquisition request signal to request the page information about the on-air-list information delivery page from the client terminal 1002 via the network interface 1113 and the communication control section 1112 in order. Corresponding to the received page information acquisition request signal, the control section 1110 sends the page information about the on-air-list information delivery page stored in the page information storage section 1116 to the client terminal 1002 via the communication control section 1112 and the network interface 1113 in order.

After the retrieval key is entered for the page information about the on-air-list information delivery page from the client terminal 1002, the retrieval section 1118 stores the retrieval key to retrieve the intended on-air-list information. When an on-air-list information request signal is transmitted to request download of the on-air-list information, the retrieval section 1118 receives the on-air-list information request signal via the network interface 1113 and the communication control section 1112 in order. The retrieval section 1118 then extracts the retrieval key from the received on-air-list information request signal.

Based on the retrieval key, the retrieval section 1118 searches the entire on-air-list information in the on-air-list information storage section 1117 for the targeted on-air-list information within a specified range corresponding to the retrieval condition indicated by the retrieval key.

As a result, the control section 1110 sends the retrieved targeted on-air-list information to the client terminal 1002 via the communication control section 1112 and the network interface 1113 in order.

A now-on-air information storage section 1119 stores radio broadcast information called now-on-air information. This information comprises: program name, program broadcast start time, and program broadcast end time of a radio program currently broadcasted from the radio station corresponding to the radio broadcast information delivery server 1006; and title, artist name, musical composition broadcast start time, and the like of a musical composition currently broadcasted in the radio program.

The client terminal 1002 sends not only a now-on-air information request signal to request to acquire the now-on-air information, but also user ID information and password information of the user who uses the client terminal 1002. The authentication processing section 1115 receives these pieces of information via the network interface 1113 and the communication control section 1112 in order. The authentication processing section 1115 then performs the user authentication process to confirm whether or not the received user ID information and password information are registered as the customer information in the customer database section 1114.

Further, the authentication processing section 1115 uses a user authentication technique different from the user authentication process that uses the user ID information and the password information. That is to say, the client terminal 1002 sends the portal authentication result information (authentication ticket to be described later) that is issued from the portal server 1003. The authentication processing section 1115 receives this information via the network interface 1113 and the communication control section 1112 in order. The authentication processing section 1115 then sends the received portal authentication result information to the portal server 1003 via the communication control section 1112 and the network interface 1113 in order.

After the authentication processing section 1115 sends the portal authentication result information to the portal server 1003, the portal server 1003 returns confirmation result information as a result of performing the authentication process (i.e., the above-mentioned confirmation process) corresponding to the portal authentication result information. The authentication processing section 1115 receives the confirmation result information via the network interface 1113 and the communication control section 1112 in order. Based on the received confirmation result information, the authentication processing section 1115 determines whether or not the user is a registered user who has completed a contract with the service provider of a music related service provision system 1000.

After terminating the user authentication process, the authentication processing section 1115 issues server authentication result information (service session ID information to be described later) indicating the result of the user authentication process.

Let us assume that the user is authenticated to be a registered user as a result of the user authentication process performed by the authentication processing section 1115. In this case, the control section 1110 sends the now-on-air information stored in the now-on-air information storage section 1119 as well as the server authentication result information to the client terminal 1002 via the communication control section 1112 and the network interface 1113 in order.

By contrast, let us assume that the user is not authenticated to be a registered user as a result of the user authentication process performed by the authentication processing section 1115. In this case, the control section 1110 sends authentication error information as well as unsuccessful authentication notification page information to the client terminal 1002 via the communication control section 1112 and the network interface 1113 in order. The unsuccessful authentication notification page information is stored in the page information storage section 1116 and indicates unsuccessful authentication.

In this manner, the control section 1110 functions in response to a request to acquire the now-on-air information from the user as follows. When the user is authenticated to be a registered user, the control section 1110 provides the now-on-air information. When the user is not authenticated to be a registered user, however, the control section 1110 prevents the user from receiving radio broadcast information delivery services provided by the radio broadcast information delivery server 1006 such as the now-on-air information delivery service.

The authentication information storage section 1120 temporarily stores the server authentication result information issued from the authentication processing section 1115. The authentication information storage section 1120 also stores various authentication information needed when the authentication processing section 1115 authenticates a user of the client terminal 1002.

(2-7) Process Overview of the Servers

With reference to sequence charts in FIGS. 18 through 23, the following outlines processes performed between the client terminal 1002 and the portal server 1003 and processes performed between the client terminal 1002 and each of the music data delivery server 1004, the trade server 1005, and the radio broadcast information delivery server 1006.

(2-7-1) User Authentication Process Between the Client Terminal 1002 and the Portal Server 1003

Figure 18:
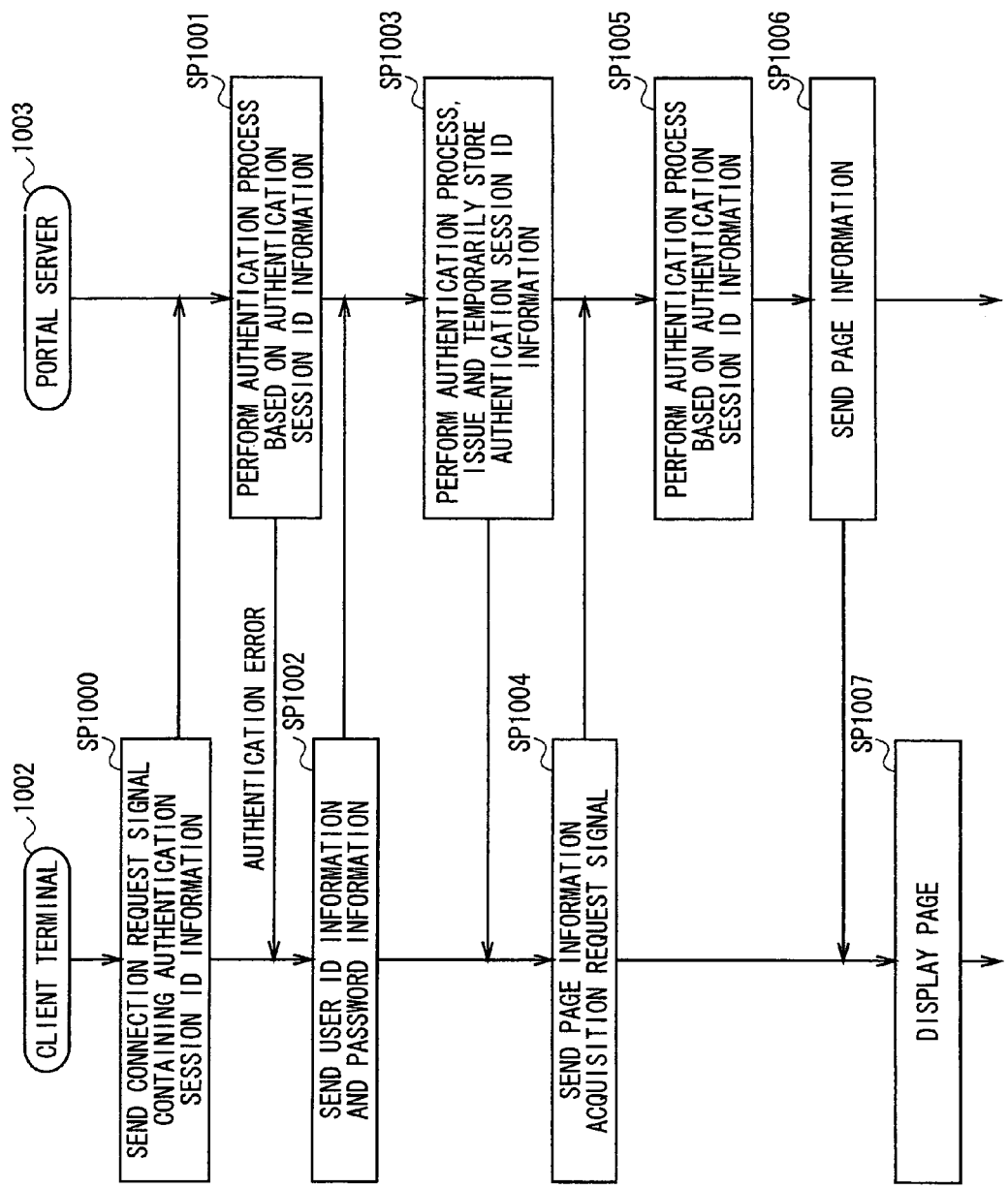
FIG. 18 is a sequence chart showing a user authentication process between the client terminal and the portal server.

With reference to FIG. 18, the following describes a user authentication process performed between the client terminal 1002 and the portal server 1003.

The control section 1023 corresponds to the client terminal 1002 for the user who contracts with the service provider of the music related service provision system 1000. For example, the user performs an operation to turn on the client terminal 1002. Alternatively, the user presses a specific operation button on the operation input section 1020. In response to such operation, the operation input section 1020 recognizes an operation input signal. The input processing section 1021 converts this signal into an operation command. The control section 1023 is supplied with this command and starts an authentication request process.

After starting the authentication request process, the control section 1023, at step SP1000, generates a connection request signal containing the authentication session ID information and the like temporarily stored in the authentication information storage section 1038. The control section 1023 sends the generated connection request signal to the portal server 1003 via the communication control section 1032 and the network interface 1033 in order.

The client terminal 1002 establishes a communication connection with the portal server 1003 to perform various processes such as the user authentication process. Each time this communication connection is established, the portal server 1003 issues the authentication session ID information as identification information to identify respective communication connection states (i.e., sessions).

For the use with the user authentication process and the like, the authentication session ID information is assigned with a specified valid period (e.g., approximately one minute) with reference to the time of issuance from the portal server 1003.

The client terminal 1002 acquires the authentication session ID information from the portal server 1003. There may be a case where the client terminal 1002 cannot supply the authentication session ID information to the portal server 1003 within the valid period. In such case, the portal server 1003 determines cancellation of the communication connection state specified by the authentication session ID information.

In this manner, the portal server 1003 prevents the previously issued authentication session ID information from being falsely used by a user not contracted with the service provider of the music related service provision system 1.

The authentication information storage section 1038 temporarily stores the authentication session ID information. This authentication session ID information was issued by the portal server 1003 that established communication connection with the client terminal 1002 to perform the user authentication process and the like.

The client terminal 1002 sends a connection request signal. In response to this, at step SP1001, the control section 1050 of the portal server 1003 receives the connection request signal via the network interface 1053 and the communication control section 1052 in order. The received connection request signal contains the authentication session ID information and the like. The control section 1050 sends the authentication session ID information and the like to the authentication processing section 1056.

Under the control of the control section 1050, the authentication processing section 1056 performs the user authentication process based on the authentication session ID information and the like received as the connection request signal from the client terminal 1002.

As a result, the authentication processing section 1056 may not be able to authenticate the user of the client terminal 1002 to be a registered user due to expiration of the valid period specified in the authentication session ID information and the like received from the client terminal 1002. In such case, the control section 1050 sends the authentication error information indicating an authentication error to the client terminal 1002 via the communication control section 1052 and the network interface 1053 in order.

At step SP1002, the control section 1023 of the client terminal 1002 receives the authentication error information sent from the portal server 1003 via the network interface 1033 and the communication control section 1032 in order. In response to this, the control section 1023 reads the user ID information, the password information, and the like stored in the authentication information storage section 1038. The control section 1023 sends the read user ID information, password information, and the like to the portal server 1003 via the communication control section 1032 and the network interface 1033 in order.

At step SP1003, the control section 1050 of the portal server 1003 receives the user ID information, the password information, and the like sent from the client terminal 1002 via the network interface 1053 and the communication control section 1052 in order. The control section 1050 sends these pieces of information to the authentication processing section 1056.

Under the control of the control section 1050, the authentication processing section 1056 performs the user authentication process. Specifically, the authentication processing section 1056 checks if the received user ID information, password information, and the like are included in the customer information registered to the customer database section 1054.

As a result, the authentication processing section 1056 may authenticate the user of the client terminal 1002 to be a registered user. In this case, under the control of the control section 1050, the authentication processing section 1056 issues the portal authentication result information, i.e., the authentication session ID information and the like about communication connection state between the client terminal 1002 and the portal server 1003 at this time. In addition, the authentication processing section 1056 temporarily stores the authentication session ID information and the like in the authentication information storage section 1057.

After the authentication processing section 1056 issued the authentication session ID information and the like to the client terminal 1002, the control section 1050 sends these pieces of information to the client terminal 1002 via the communication control section 1052 and the network interface 1053 in order.

At step SP1004, the control section 1023 of the client terminal 1002 receives the authentication session ID information and the like sent from the portal server 1003 via the network interface 1033 and the communication control section 1032 in order. The control section 1023 then sends the received authentication session ID information and the like to the authentication processing section 1037.

Under the control of the control section 1023, the authentication processing section 1037 temporarily stores the received authentication session ID information and the like in the authentication information storage section 1038.

The control section 1023 receives the page information acquisition request signal from the portal server 1003 to request the portal server 1003 for the page information. The control section 1023 sends the received signal together with the authentication session ID information and the like temporarily stored in the authentication information storage section 1038 to the portal server 1003 via the communication control section 1032 and the network interface 1033 in order.

At step SP1005, the control section 1050 of the portal server 1003 receives the page information acquisition request signal, the authentication session ID information, and the like sent from the client terminal 1002 via the network interface 1053 and the communication control section 1052 in order. The control section 1050 sends the received authentication session ID information and the like to the authentication processing section 1056.

Under the control of the control section 1050, the authentication processing section 1056 performs the user authentication process. Specifically, the authentication processing section 1056 compares the received authentication session ID information and the like with the authentication session ID information and the like that were issued to the client terminal 1002 at the above-mentioned step SP1003 and were temporarily stored in the authentication information storage section 1057.

As a result, at step SP1006, the authentication processing section 1056 authenticates the user of the client terminal 1002 to be a registered user. The authentication processing section 1056 determines that the terminal 1002 issued the valid acquisition request for the page information. The authentication processing section 1056 extends the valid period for the authentication session ID information and the like issued to the client terminal 1002.

At this time, the control section 1050 reads the user-requested page information from the page information storage section 1055. The control section 1050 sends the read page information, the authentication session ID information, and the like to the client terminal 1002 via the communication control section 1052 and the network interface 1053 in order. At this time, the authentication session ID information and the like are assigned with the valid period extended by the authentication processing section 1056.

At step SP1007, the control section 1023 of the client terminal 1002 receives the page information sent from the portal server 1003 and the authentication session ID information with the extended valid period and the like via the network interface 1033 and the communication control section 1032 in order. The control section 1023 sends the received page information to the page information generation section 1036 and sends the authentication session ID information with the extended valid period and the like to the authentication processing section 1037.

Based on the page information supplied from the control section 1023, the page information generation section 1036 generates video data embedded with links to the music data delivery server 1004, the trade server 1005, and the radio broadcast information delivery server 1006. The page information generation section 1036 sends the generated video data to the display control section 1024.

The display control section 1024 applies a digital-analog conversion process to the video data supplied from the page information generation section 1036. The display control section 1024 then sends the converted analog video signal to the display section 1025. As a result, the display section 1025 displays the page of the portal server 1003 as a video based on the analog video signal.

The authentication processing section 1037 updates the authentication session ID information and the like temporarily stored at the above-mentioned step SP1004 to the authentication session ID information with the extended valid period and the like as follows. Under the control of the control section 1023, the authentication processing section 1037 temporarily stores the authentication session ID information with the extended valid period and the like received from the portal server 1003 in the authentication information storage section 1038 so as to overwrite the authentication session ID information having the valid period not extended and the like.

(2-7-2) User Authentication Process Between the Client Terminal 1002 and Each of the Servers 1004 Through 1006

Figure 19:
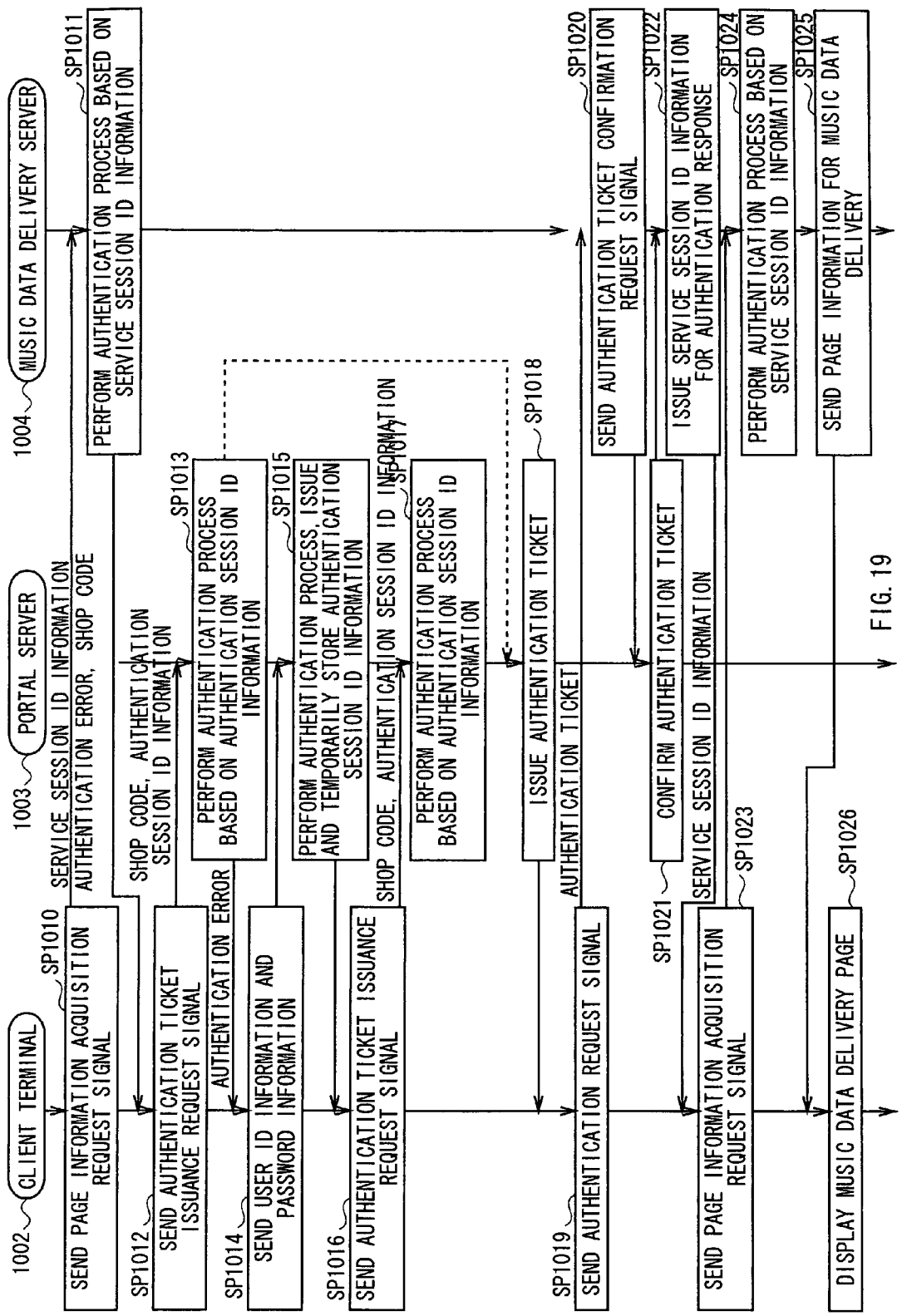
FIG. 19 is a sequence chart showing a user authentication process between the client terminal and the music data delivery server.

With reference to FIG. 19, the following describes the user authentication process performed between the client terminal 1002 and each of the music data delivery server 1004, the trade server 1005, and the radio broadcast information delivery server 1006.

As an example of the user authentication process, the client terminal 1002 once acquires the page information from the portal server 1003 as mentioned above with reference to FIG. 18. The page information contains links for access to the music data delivery server 1004, the trade server 1005, and the radio broadcast information delivery server 1006 to perform the user authentication process. This user authentication process is hereinafter referred to as an indirect access authentication process.

As another example of the user authentication process, the client terminal 1002 does not acquire the page information from the portal server 1003. Instead, previously "bookmarked" URL information and the like are used for direct access to the music data delivery server 1004, the trade server 1005, and the radio broadcast information delivery server 1006. This user authentication process is hereafter referred to as a direct access authentication process.

The indirect access authentication process can be performed just the same in any combinations of the client terminal 1002 and the music data delivery server 1004, the trade server 1005, and the radio broadcast information delivery server 1006.

The direct access authentication process can be also performed just the same in any combinations of the client terminal 1002 and the music data delivery server 1004, the trade server 1005, and the radio broadcast information delivery server 1006.

The indirect access authentication process differs from the direct access authentication process only as to a manner of acquiring URL information used by the client terminal 1002 for access to the music data delivery server 1004, the trade server 1005, and the radio broadcast information delivery server 1006. After the URL information is acquired, the indirect access authentication process and the direct access authentication process can be performed just the same.

In the following description, the music data delivery server 1004 represents an access destination of the client terminal 1002 for simplicity. Further, the indirect access authentication process and the direct access authentication process are described as one user authentication process.

At step SP1010, the control section 1023 of the client terminal 1002 follows the URL information embedded as links in the page information or the URL information and the like already registered as bookmarks. The control section 1023 transmits the service session ID information and the like read from the authentication information storage section 1038 as well as a page information acquisition request signal to the music data delivery server 1004 via the communication control section 1032 and the network interface 1033 in order. The page information acquisition request signal requests to acquire the page information about music data delivery pages. The page information concerns package media sales pages and on-air-list information delivery pages for the trade server 1005 and the radio broadcast information delivery server 1006.

The client terminal 1002 establishes a communication connection with the music data delivery server 1004, the trade server 1005, and the radio broadcast information delivery server 1006 to perform various processes such as the user authentication process. Each time this communication connection is established, the music data delivery server 1004, the trade server 1005, and the radio broadcast information delivery server 1006 accessed by the client terminal 1002 issue the service session ID information as identification information to identify respective communication connection states (i.e., sessions).

For the use with the user authentication process and the like, the service session ID information, like the authentication session ID information, is assigned with a specified valid period (e.g., approximately one minute) with reference to the time of issuance from the music data delivery server 1004, the trade server 1005, and the radio broadcast information delivery server 1006.

The client terminal 1002 acquires the service session ID information from the servers 1004 through 1006. There may be a case where the client terminal 1002 cannot supply the service session ID information to the information-issuing servers such as the music data delivery server 1004, the trade server 1005, and the radio broadcast information delivery server 1006 within the valid period. In such case, the information-issuing servers such as the music data delivery server 1004, the trade server 1005, and the radio broadcast information delivery server 1006 determine cancellation of the communication connection state specified by the service session ID information.

In this manner, the music data delivery server 1004, the trade server 1005, and the radio broadcast information delivery server 1006 prevent the previously issued service session ID information from being falsely used by a user not contracted with the service provider of the music related service provision system 1.

The authentication information storage section 1038 temporarily stores the service session ID information. This service session ID information was issued by the music data delivery server 1004, the trade server 1005, and the radio broadcast information delivery server 1006 that established communication connection with the client terminal 1002 to perform the user authentication process and the like.

At step SP1011, the control section 1070 of the music data delivery server 1004 receives the page information acquisition request signal, the service session ID information, and the like transmitted from the client terminal 1002 via the network interface 1073 and the communication control section 1072 in order. The control section 1070 transmits the received service session ID information and the like to the authentication processing section 1075.

Under the control of the control section 1070, the authentication processing section 1075 performs the user authentication process. Specifically, the authentication processing section 1075 compares the received service session ID information and the like with the service session ID information and the like temporarily stored in the authentication information storage section 1077.

As a result, the authentication processing section 1075 may not be able to authenticate the user of the client terminal 1002 to be a registered user, e.g., due to expiration of the valid period for the service session ID information received from the client terminal 1002. In such case, the authentication processing section 1075 determines that the client terminal 1002 issued an invalid acquisition request for the page information about the music data delivery page.

In this case, the control section 1070 transmits authentication error information and a shop code to the client terminal 1002 via the communication control section 1072 and the network interface 1073 in order. The authentication error information indicates an authentication error. The shop code is provided to identify the music data delivery server 1004.

At step SP1012, the control section 1023 of the client terminal 1002 receives the authentication error information and the shop code transmitted from the music data delivery server 1004 via the network interface 1033 and the communication control section 1032 in order. According to the received authentication error information, the control section 1023 determines that the music data delivery server 1004 does not authenticate the user as a registered user. In addition, the control section 1023 temporarily stores the shop code received from the music data delivery server 1004 in the authentication information storage section 1038.

The control section 1023 generates an authentication ticket issuance request signal that requests the portal server 1003 to issue an authentication ticket for access to the music data delivery server 1004. The control section 1023 then transmits the generated authentication ticket issuance request signal, the shop code of the music data delivery server 1004, the authentication session ID information, and the like to the portal server 1003 via the communication control section 1032 and the network interface 1033 in order. It should be noted that the authentication session ID formation and the like are already received from the portal server 1003 and are temporarily stored in the authentication information storage section 1038.

At step SP1013, the control section 1050 of the portal server 1033 receives the authentication ticket issuance request signal, the shop code, the authentication session ID information, and the like sent from the client terminal 1002 via the network interface 1053 and the communication control section 1052 in order. The control section 1050 then sends these pieces of information to the authentication processing section 1056.

Under the control of the control section 1050, the authentication processing section 1056 performs the user authentication process. Specifically, the control section 1056 compares the authentication session ID information and the like with the authentication session ID information and the like temporarily stored in the authentication information storage section 1057.

As a result, the authentication processing section 1056 may not be able to authenticate the user of the client terminal 1002 to be a registered user, e.g., due to expiration of the valid period for the authentication session ID information received from the client terminal 1002. In such case, the authentication processing section 1056 determines that the client terminal 1002 issued an invalid acquisition request for the authentication ticket.

In this case, the control section 1050 sends authentication error information indicating an authentication error to the client terminal 1002 via the communication control section 1052 and the network interface 1053 in order.

By contrast, there may be a case where the valid period still takes effect for the authentication session ID information received from the client terminal 1002. In such case, the authentication processing section 1056 authenticates the user of the client terminal 1002 to be a registered user. The authentication processing section 1056 determines that the client terminal 1002 issues a valid request for the authentication ticket. In this case, the control section 1050 moves to step SP1018 to be described later.

At step SP1014, the control section 1023 of the client terminal 1002 receives the authentication error information sent from the portal server 1003 via the network interface 1033 and the communication control section 1032 in order. The control section 1023 then reads the user ID information, the password information, and the like stored in the authentication information storage section 1038. In addition, the control section 1023 sends the read user ID information, the password information, and the like to the portal server 1003 via the communication control section 1032 and the network interface 1033 in order.

At step SP1015, the control section 1050 of the portal server 1003 receives the user ID information, the password information, and the like sent from the client terminal 1002 via the network interface 1053 and the communication control section 1052 in order. The control section 1050 then sends these pieces of information to the authentication processing section 1056.

Under the control of the control section 1050, the authentication processing section 1056 performs the user authentication process. Specifically, the authentication processing section 1056 checks whether or not the customer information registered to the customer database section 1054 contains the received user ID information, the password information, and the like.

As a result, the authentication processing section 1056 authenticates the user of the client terminal 1002 to be a registered user. Under the control of the control section 1050, the authentication processing section 1056 issues the portal authentication result information, i.e., the authentication session ID information and the like about the state of communication connection between the client terminal 1002 and the portal server 1003 at the present time. The authentication processing section 1056 temporarily stores the issued authentication session ID information and the like in the authentication information storage section 1057.

After the authentication processing section 1056 issues the authentication session ID information and the like to the client terminal 1002, the control section 1050 sends the authentication session ID information and the like to the client terminal 1002 via the communication control section 1052 and the network interface 1053 in order.

At step SP1016, the control section 1023 of the client terminal 1002 receives the authentication session ID information and the like sent from the portal server 1003 via the network interface 1033 and the communication control section 1032 in order. The authentication processing section 1037 temporarily stores the received authentication session ID information and the like in the authentication information storage section 1038.

The control section 1023 generates an authentication ticket issuance request signal that re-requests the portal server 1003 to issue an authentication ticket. The control section 1023 sends the generated authentication ticket issuance request signal as well as the shop code temporarily stored in the authentication information storage section 1038 and the authentication session ID information and the like temporarily stored at this time to the portal server 1003 via the communication control section 1032 and the network interface 1033 in order.

According to the embodiment, the client terminal 1002 temporarily stores the shop code in the authentication information storage section 1038. The present invention is not limited thereto. When performing the process at steps SP1012 through SP1016, the client terminal 1002 can sequentially exchange the shop code with the portal server 1003. In this manner, the client terminal 1002 need not temporarily store the shop code in the authentication information storage section 1038. Nevertheless, it is possible to send the shop code to the portal server 1003 at step SP1016.

At step SP1017, the control section 1050 of the portal server 1003 receives the authentication ticket issuance request signal, the shop code, the authentication session ID information, and the like sent from the client terminal 1002 via the network interface 1053 and the communication control section 1052 in order. The control section 1050 sends the received authentication ticket issuance request signal and the like to the authentication processing section 1056.

Under the control of the control section 1050, the authentication processing section 1056 performs the user authentication process. Specifically, the authentication processing section 1056 compares the received authentication session ID information and the like with the authentication session ID information and the like temporarily stored in the authentication information storage section 1057.

As a result, there may be a case where the valid period still takes effect for the authentication session ID information and the like received from the client terminal 1002. In such case, the authentication processing section 1056 authenticates the user of the client terminal 1002 to be a registered user. The authentication processing section 1056 determines that the client terminal 1002 issues a valid request for the authentication ticket.

At step SP1018, under the control of the control section 1050, based on the shop code and the authentication ticket issuance request signal received from the client terminal 1002 at the above-mentioned step SP1017. The authentication processing section 1056 issues the portal authentication result information, i.e., an authentication ticket and the like to enable access to the music data delivery server 1004 indicated by the shop code.

Under the control of the control section 1050, the authentication processing section 1056 temporarily stores the issued authentication ticket and the like in the authentication information storage section 1057. In addition, the authentication processing section 1056 extends the valid period for the authentication session ID information and the like issued to the client terminal 1002.

That is to say, the authentication processing section 1056 has issued the authentication ticket and the like and extended the valid period of the authentication session ID information and the like. Thereafter, the control section 1050 sends these authentication ticket and the like and authentication session ID information and the like to the client terminal 1002 via the communication control section 1052 and the network interface 1053 in order.

At step SP1019, the control section 1023 of the client terminal 1002 receives the authentication ticket and the like sent from the portal server 1003 and the authentication session ID information with the extended valid period via the network interface 1033 and the communication control section 1032 in order. The control section 1023 sends the received authentication session ID information to the authentication processing section 1037.

The control section 1023 sends the authentication ticket and the like received from the portal server 1003 together with the authentication request signal to the music data delivery server 1004 via the communication control section 1032 and the network interface 1033 in order.

At this time, under the control of the control section 1023, the authentication processing section 1037 temporarily stores the authentication session ID information having the extended valid period received from the portal server 1003 in the authentication information storage section 1038 so as to overwrite the authentication session ID information having the valid period not extended. In this manner, the authentication processing section 1037 updates the authentication session ID information temporarily stored at the above-mentioned step SP1016 to the authentication session ID information having the extended valid period.

At step SP1020, the control section 1070 of the music data delivery server 1004 receives the authentication request signal, the authentication ticket, and the like transmitted from the client terminal 1002 via the network interface 1073 and the communication control section 1072 in order.

The control section 1070 transmits the authentication ticket and the like received from the client terminal 1002 together with an authentication ticket confirmation request signal for requesting confirmation of the authentication ticket and the like to the portal server 1003 via the communication control section 1072 and the network interface 1073 in order.

At step SP1021, the control section 1050 of the portal server 1003 receives the authentication ticket confirmation request signal, the authentication ticket, and the like transmitted from the music data delivery server 1004 via the network interface 1053 and the communication control section 1052 in order. The control section 1050 then transmits the received authentication ticket confirmation request signal, the authentication ticket, and the like to the authentication processing section 1056.

Under the control of the control section 1050, the authentication processing section 1056 performs a confirmation process for the authentication ticket received from the music data delivery server 1004 in response to the authentication ticket confirmation request signal. Specifically, the authentication processing section 1056 compares the received authentication ticket and the like with the authentication ticket and the like temporarily stored in the authentication information storage section 1057.

As a result, the authentication processing section 1056 confirms that the genuine authentication ticket and the like are received from the music data delivery server 1004. In this case, the control section 1050 transmits confirmation result information to the music data delivery server 1004 via the communication control section 1052 and the network interface 1053 in order. The confirmation result information indicates that the received authentication ticket and the like are confirmed to be genuine.

At step SP1022, the control section 1070 of the music data delivery server 1004 receives the confirmation result information transmitted from the portal server 1003 via the network interface 1073 and the communication control section 1072 in order. The control section 1070 transmits the received confirmation result information to the authentication processing section 1075.

Under control of the control section 1070, the authentication processing section 1075 responds to the confirmation result information and issues server authentication result information, i.e., service session ID information and the like about the state of communication connection between the client terminal 1002 and the music data delivery server 1004 at the present time. In addition, the authentication processing section 1075 temporarily stores the issued service session ID information and the like in the authentication information storage section 1077.

After the authentication processing section 1075 issued the service session ID information and the like to the client terminal 1002, the control section 1070 transmits these pieces of information to the client terminal 1002 via the communication control section 1072 and the network interface 1073 in order.

At step SP1023, the control section 1023 of the client terminal 1002 receives the service session ID information and the like sent from the music data delivery server 1004 via the network interface 1033 and the communication control section 1032 in order. The authentication processing section 1037 temporarily stores the received service session ID information and the like in the authentication information storage section 1038.

The control section 1023 transmits the page information acquisition request signal, the service session ID information, and the like to the music data delivery server 1004 via the communication control section 1032 and the network interface 1033 in order. The page information acquisition request signal requests the page information about the music data delivery page. The service session ID information is temporarily stored in the authentication information storage section 1038.

As step SP1024, the control section 1070 of the music data delivery server 1004 receives the page information acquisition request signal, the service session ID information, and the like transmitted from the client terminal 1002 via the network interface 1073 and the communication control section 1072 in order. The control section 1070 then transmits the received service session ID information and the like to the authentication processing section 1075.

Under the control of the control section 1070, the authentication processing section 1075 performs the user authentication process. Specifically, the control section 1070 compares the received service session ID information and the like with the service session ID information and the like that are already issued to the client terminal 1002 at the above-mentioned step SP1022 and are temporarily stored in the authentication information storage section 1077.

As a result, there may be a case where the valid period still takes effect for the service session ID information and the like received from the client terminal 1002. In such case, the authentication processing section 1075 authenticates the user of the client terminal 1002 to be a registered user. The authentication processing section 1075 determines that the client terminal 1002 issues a valid request to acquire the page information about the music data delivery page.

The control section 1070 then proceeds to the next step SP1025. At step SP1025, the control section 1070 reads the page information about the user-requested music data delivery page from the page information storage section 1076. In addition, the control section 1070 allows the authentication processing section 1075 to extend the valid period for the service session ID information and the like issued to the client terminal 1002.

The control section 1070 transmits the page information about the music data delivery page read from the page information storage section 1076 together with the service session ID information and the like to the client terminal 1002 via the communication control section 1072 and the network interface 1073 in order. The service session ID information and the like have the valid period extended by the authentication processing section 1075.

At step SP1026, the control section 1023 of the client terminal 1002 receives the page information about the music data delivery page, the service session ID information having the extended valid period, and the like from the music data delivery server 1004 via the network interface 1033 and the communication control section 1032 in order. The control section 1023 transmits the page information about the received music data delivery page to the page information generation section 1036. In addition, the control section 1023 transmits the received service session ID information and the like to the authentication processing section 1037.

Under the control of the control section 1023, the authentication processing section 1037 temporarily stores the received service session ID information having the extended valid period and the like in the authentication information storage section 1038 so as to overwrite the service session ID information and the like before extension of the valid period. In this manner, the authentication processing section 1037 updates the service session ID information and the like temporarily stored at the above-mentioned step SP1023 to the service session ID information having the extended valid period and the like.

Further, the page information generation section 1036 generates video data based on the page information about the music data delivery page. The page information generation section 1036 transmits the generated video data to the display control section 1024.

The display control section 1024 applies a digital-analog conversion process to the video data supplied from the page information generation section 1036. The display control section 1024 then transmits the obtained analog video signal to the display section 1025. As a result, the display section 1025 displays the music data delivery page as a video based on the analog video signal.

(2-7-3) Music Related Service Provision Processes

With reference to FIGS. 20 through 23, the following describes music related service provision processes. These processes occur after completion of the user authentication process performed between the client terminal 1002 and each of the music data delivery server 1004, the trade server 1005, and the radio broadcast information delivery server 1006 as mentioned above with reference to FIG. 19. During a music related service provision process, the client terminal 1002 uses page information about music data delivery pages, package media sales pages, and on-air-list information delivery pages. The client terminal 1002 acquired the page information during the user authentication process from the music data delivery server 1004, the trade server 1005, and the radio broadcast information delivery server 1006. Using that page information and the like, the client terminal 1002 is provided with music data delivery services, trade services, and radio broadcast information delivery services.

(2-7-3-1) Music Data Delivery Service Provision Process

Figure 20:
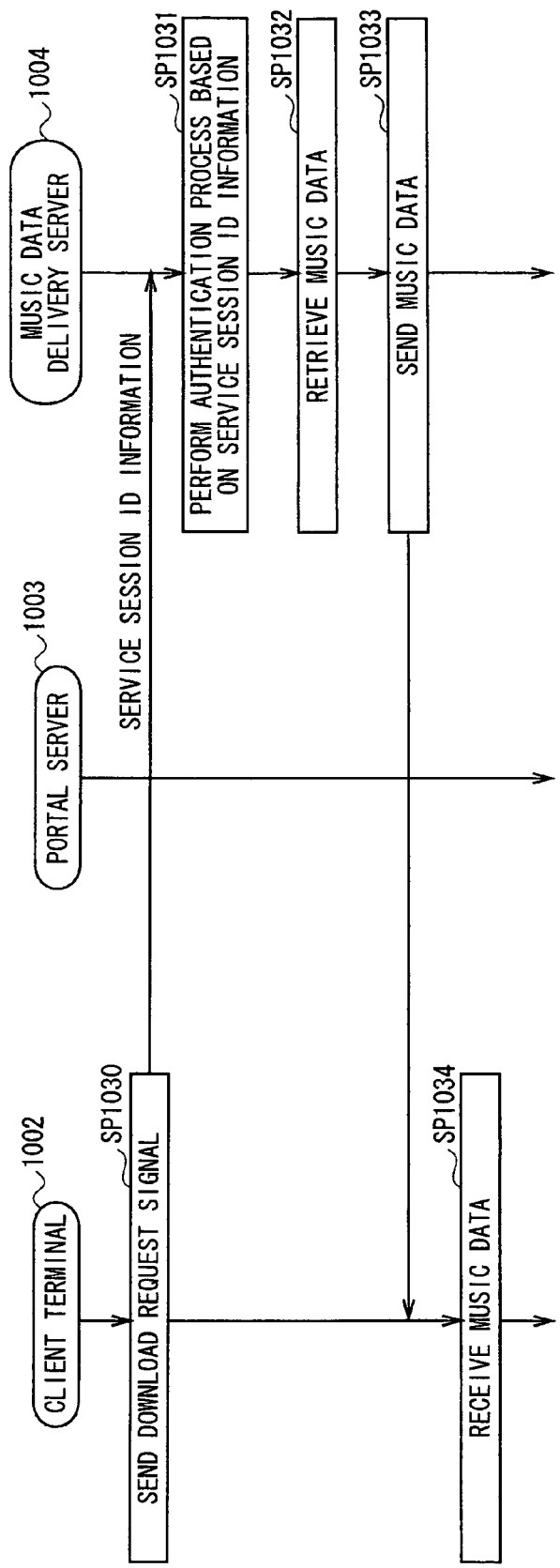
FIG. 20 is a sequence chart showing a music data delivery service provision process.

With reference to FIG. 20, the following describes a music data delivery service provision process. During this process, the client terminal 1002 is provided with music data delivery services from the music data delivery server 1004.

For example, the user uses the input processing section 1021 to enter a control command to select part of the music data delivery page displayed as video on the display section 1025. At step SP1030, the control section 1023 of the client terminal 1002 responds to the entered control command to generate a download request signal that requests to download music data intended for download.

The control section 1023 transmits the download request signal together with service session ID information and the like to the music data delivery server 1004 via the communication control section 1032 and the network interface 1033 in order. The service session ID information and the like are already issued by the music data delivery server 1004 and are temporarily stored in the authentication information storage section 1038.

At step SP1031, the control section 1070 of the music data delivery server 1004 receives the download request signal, the service session ID information, and the like transmitted from the client terminal 1002 via the network interface 1073 and the communication control section 1072 in order. The control section 1070 then transmits the received service session ID information and the like to the authentication processing section 1075.

Under the control of the control section 1070, the authentication processing section 1075 performs the user authentication process. Specifically, the authentication processing section 1075 compares the received service session ID information and the like with the service session ID information and the like temporarily stored in the authentication information storage section 1077.

As a result, the authentication processing section 1075 may authenticate the user to be a registered user who requested to download the music data using the client terminal 1002. In this case, the control section 1070 proceeds to the next step SP1032.

At step SP1032, based on the retrieval key stored in the download request signal, the retrieval section 1079 searches a plurality of pieces of music data in the music data storage section 1078 for music data intended for download, i.e., one matching a retrieval condition indicated by the retrieval key.

Let us assume that the retrieval section 1079 retrieves the music data. The control section 1070 allows the authentication processing section 1075 to extend the valid period for the service session ID information and the like issued to the client terminal 1002. The control section 1070 then proceeds to the next step SP1033.

At step SP1033, the control section 1070 reads the music data intended for download retrieved by the retrieval section 1079 from the music data storage section 1078. In addition, the control section 1070 transmits the read music data intended for download together with the service session ID information and the like to the client terminal 1002 via the communication control section 1072 and the network interface 1073 in order. At this time, the service session ID information has the valid period extended by the authentication processing section 1075.

At step SP1034, the control section 1023 of the client terminal 1002 receives the music data intended for download transmitted from the music data delivery server 1004, the service session ID information having the extended valid period, and the like via the network interface 1033 and the communication control section 1032 in order. The control section 1023 stores the received music data in the storage medium 1029. In addition, the control section 1023 transmits the received service session ID information and the like to the authentication processing section 1037.

Under the control of the control section 1023, the authentication processing section 1037 temporarily stores the received service session ID information having the extended valid period and the like in the authentication information storage section 1038 so as to overwrite the service session ID information and the like before extension of the valid period. In this manner, the authentication processing section 1037 updates the contents of the service session ID information and the like temporarily stored in the authentication information storage section 1038.

In this manner, the client terminal 1002 can download user-specified music data using the music data delivery service provided from the music data delivery server 1004.

(2-7-3-2) Trade Service Provision Process

Figure 21:
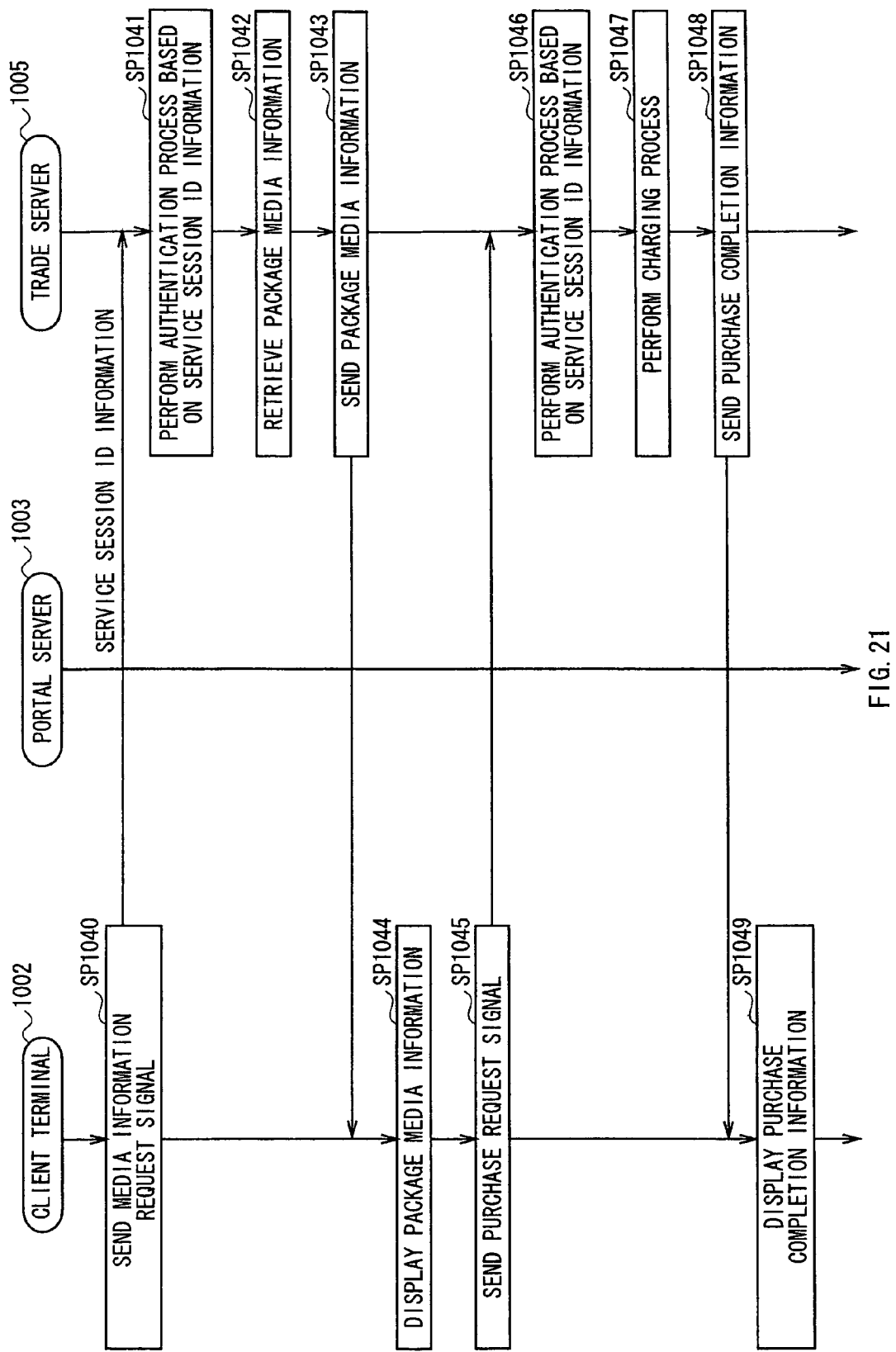
FIG. 21 is a sequence chart showing a trade service provision process.

With reference to FIG. 21, the following describes a trade service provision process during which the client terminal 1002 is provided with trade services from the trade server 1005.

For example, the user uses the input processing section 1021 to enter a control command to select part of the package media sales page displayed as video on the display section 1025. At step SP1040, the control section 1023 of the client terminal 1002 generates a media information request signal that requests package media information about a specific package media corresponding to the entered control command.

The control section 1023 transmits the media information request signal together with service session ID information and the like to the trade server 1005 via the communication control section 1032 and the network interface 1033 in order. The service session ID information and the like are already issued by the trade server 1005 and are temporarily stored in the authentication information storage section 1038.

At step SP1041, the control section 1090 of the trade server 1005 receives the media information request signal, the service session ID information, and the like transmitted from the client terminal 1002 via the network interface 1093 and the communication control section 1092 in order. The control section 1090 then transmits the received service session ID information and the like to the authentication processing section 1095.

Under the control of the control section 1090, the authentication processing section 1095 performs the user authentication process. Specifically, the authentication processing section 1095 compares the received service session ID information and the like with the service session ID information and the like temporarily stored in the authentication information storage section 1097.

As a result, the authentication processing section 1095 may authenticate the user to be a registered user who requested the package media information about the package media using the client terminal 1002. In this case, the control section 1090 proceeds to the next step SP1042.

At step SP1042, based on the retrieval key stored in the media information request signal, the retrieval section 1099 searches a plurality of pieces of package media information in the package media information storage section 1098 for package media information about the specific package media, i.e., one matching a retrieval condition indicated by the retrieval key.

Let us assume that the retrieval section 1099 retrieves the package media information. The control section 1090 allows the authentication processing section 1095 to extend the valid period for the service session ID information and the like issued to the client terminal 1002. The control section 1090 then proceeds to the next step SP1043.

At step SP1043, the control section 1090 reads the package media information retrieved by the retrieval section 1099 from the package media information storage section 1098. In addition, the control section 1090 transmits the read package media information together with the service session ID information and the like to the client terminal 1002 via the communication control section 1092 and the network interface 1093 in order. At this time, the service session ID information has the valid period extended by the authentication processing section 1095.

At step SP1044, the control section 1023 of the client terminal 1002 receives the package media information transmitted from the trade server 1005, the service session ID information having the extended valid period, and the like via the network interface 1033 and the communication control section 1032 in order. The control section 1023 transmits the received package media information to the page information generation section 1036. In addition, the control section 1023 transmits the received service session ID information and the like to the authentication processing section 1037.

Under the control of the control section 1023, the authentication processing section 1037 temporarily stores the received service session ID information having the extended valid period and the like in the authentication information storage section 1038 so as to overwrite the service session ID information and the like before extension of the valid period. In this manner, the authentication processing section 1037 updates the contents of the service session ID information and the like temporarily stored in the authentication information storage section 1038.

The page information generation section 1036 generates video data based on the package media information supplied from the control section 1023. The display control section 1024 converts the generated video data into an analog video signal and transmits it to the display section 1025.

In this manner, the control section 1023 allows the display section 1025 to display the package media information as a video based on the analog video signal. The control section 1023 then proceeds to the next step SP1045.

Let us assume that the user uses the input processing section 1021 to enter a control command to request to purchase a package media corresponding to the package media information displayed as video on the display section 1025. At step SP1045, the control section 1023 responds to the entered control command and generates a purchase request signal to request to purchase the package media.

The control section 1023 transmits the purchase request signal together with service session ID information (i.e., having the extended valid period) and the like to the trade server 1005 via the communication control section 1032 and the network interface 1033 in order. The service session ID information and the like are already received from the trade server 1005 and are temporarily stored in the authentication information storage section 1038.

At step SP1046, the control section 1090 of the trade server 1005 receives the purchase request signal, the service session ID information, and the like transmitted from the client terminal 1002 via the network interface 1093 and the communication control section 1092 in order. The control section 1090 then transmits the received service session ID information and the like to the authentication processing section 1095.

Under the control of the control section 1090, the authentication processing section 1095 performs the user authentication process. Specifically, the authentication processing section 1095 compares the received service session ID information and the like with the service session ID information and the like temporarily stored in the authentication information storage section 1097.

As a result, the authentication processing section 1095 may authenticate the user to be a registered user who requested to purchase the package media using the client terminal 1002. In this case, the control section 1090 proceeds to the next step SP1047.

At step SP1047, the control section 1090 performs purchase processes such as shipping the requested package media to the user of the client terminal 1002. The control section 1090 transmits charging information to the charging server 1008 via the communication control section 1092 and the network interface 1093 in order. The charging information is used to charge the user who purchased the package medium. In this manner, the control section 1090 allows the charging server 1008 to perform a charging process corresponding to the user's purchase of the package medium.

Further, the control section 1090 allows the authentication processing section 1090 to extend the valid period of the service session ID information and the like issued to the client terminal 1002.

After terminating the charging process, at step SP1048, the control section 1090 transmits purchase completion information as well as the service session ID information and the like to the client terminal 1002 via the communication control section 1092 and the network interface 1093 in order. At this time, the purchase completion information indicates completion of the package media purchase process. The authentication processing section 1095 has extended the valid period of the service session ID information.

At step SP1049, the control section 1023 of the client terminal 1002 receives the purchase completion information and the service session ID information and the like via the network interface 1033 and the communication control section 1032 in order. The purchase completion information is transmitted from the trade server 1005. The service session ID information has the extended valid period. The control section 1023 then transmits the received purchase completion information to the page information generation section 1036. In addition, the control section 1023 transmits the service session ID information and the like received from the trade server 1005 to the authentication processing section 1037.

Under the control of the control section 1023, the authentication processing section 1037 temporarily stores the received service session ID information having the extended valid period and the like in the authentication information storage section 1038 so as to overwrite the service session ID information and the like before extension of the valid period. In this manner, the authentication processing section 1037 updates the contents of the service session ID information and the like temporarily stored in the authentication information storage section 1038.

Further, the page information generation section 1036 generates video data based on the purchase completion information supplied from the control section 1023. The display control section 1024 converts the generated video data into an analog video signal and transmits it to the display section 1025.

The control section 1023 allows the display section 1025 to display the purchase completion page as a video based on the analog video signal.

In this manner, the client terminal 1002 can allow the user to purchase intended package media using the trade service provided by the trade server 1005.

(2-7-3-3) On-Air-List Information Delivery Service Provision Process

Figure 22:
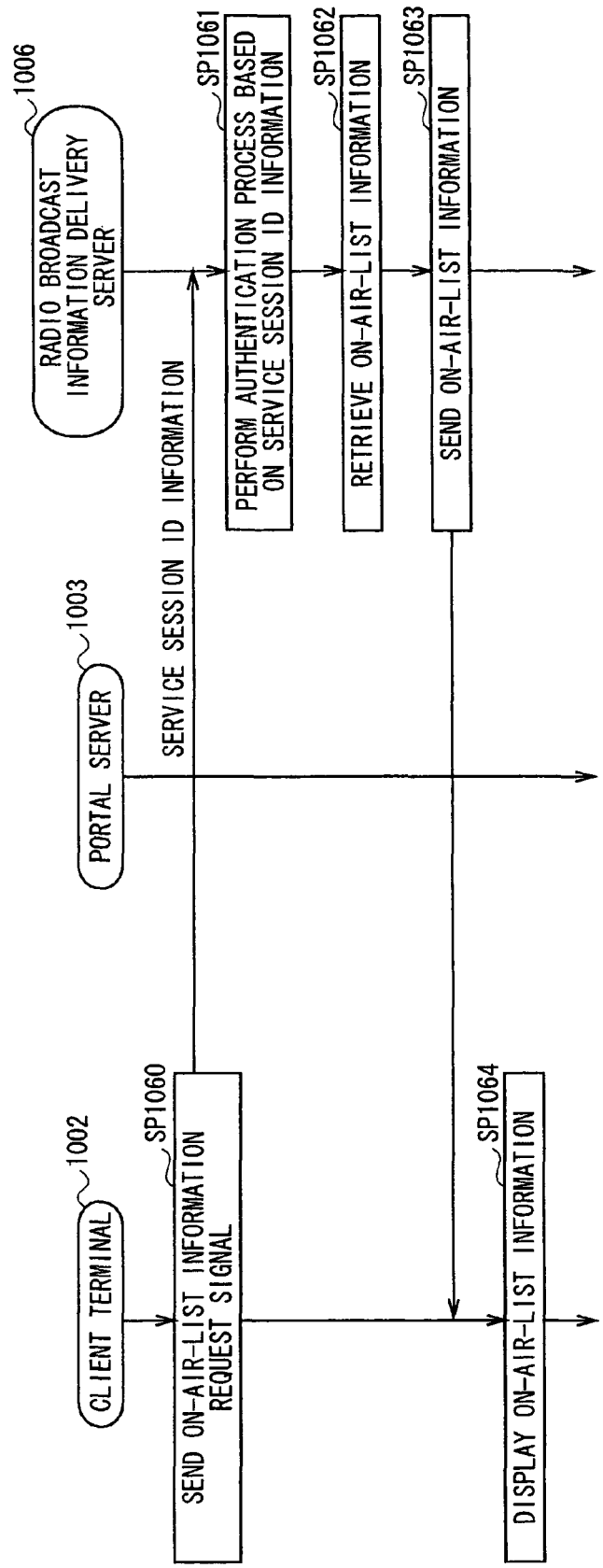
FIG. 22 is a sequence chart showing a radio broadcast information (on-air list information) delivery service provision process (1)

With reference to FIG. 22, the following describes the radio broadcast information delivery service provision process. During this process, the client terminal 1002 is provided with a radio broadcast information delivery service, especially an on-air-list information delivery service from the radio broadcast information delivery server 1006.

For example, the user enters retrieval key to retrieve intended on-air-list information into an input box of the on-air-list information delivery page displayed as a video on the display section 1025. A control command corresponding to a character string indicating the entered retrieval key is input through the input processing section 1021. At step SP1060, the control section 1023 of the client terminal 1002 responds to the entered control command and generates an on-air-list information request signal to request download of the intended on-air-list information.

The control section 1023 sends the on-air-list information request signal together with the service session ID information and the like to the radio broadcast information delivery server 1006 via the communication control section 1032 and the network interface 1033 in order. The service session ID information and the like are already issued by the radio broadcast information delivery server 1006 and are temporarily stored in the authentication information storage section 1038.

At step SP1061, the control section 1110 of the radio broadcast information delivery server 1006 receives the on-air-list information request signal, the service session ID information, and the like sent from the client terminal 1002 via the network interface 1113 and the communication control section 1112 in order. The control section 1110 then sends the received service session ID information and the like to the authentication processing section 1115.

Under the control of the control section 1110, the authentication processing section 1115 performs the user authentication process. Specifically, the authentication processing section 1115 compares the received service session ID information and the like with the service session ID information and the like temporarily stored in the authentication information storage section 1120.

As a result, the authentication processing section 1115 may authenticate the user to be a registered user who requested the on-air-list information using the client terminal 1002. In this case, the control section 1110 proceeds to the next step SP1062.

At step SP1062, based on the retrieval key stored in the on-air-list information request signal, the retrieval section 1118 searches the entire on-air-list information in the on-air-list information storage section 1117 for the targeted on-air-list information within a specified range corresponding to the retrieval condition indicated by the retrieval key.

Let us assume that the retrieval section 1118 retrieves the on-air-list information. The control section 1110 allows the authentication processing section 1115 to extend the valid period for the service session ID information and the like issued to the client terminal 1002. The control section 1110 then proceeds to the next step SP1063.

At step SP1063, the control section 1110 reads the on-air-list information retrieved by the retrieval section 1118 from the on-air-list information storage section 1117. In addition, the control section 1110 sends the read on-air-list information together with the service session ID information and the like to the client terminal 1002 via the communication control section 1112 and the network interface 1113 in order. At this time, the service session ID information has the valid period extended by the authentication processing section 1115.

At step SP1064, the control section 1023 of the client terminal 1002 receives the on-air-list information sent from the radio broadcast information delivery server 1006, the service session ID information having the extended valid period, and the like via the network interface 1033 and the communication control section 1032 in order. The control section 1023 sends the received on-air-list information to the page information generation section 1036. In addition, the control section 1023 sends the service session ID information and the like received from the radio broadcast information delivery server 1006 to the authentication processing section 1037.

Under the control of the control section 1023, the authentication processing section 1037 temporarily stores the received service session ID information having the extended valid period in the authentication information storage section 1038 so as to overwrite the service session ID information having the valid period not extended. In this manner, the authentication processing section 1037 updates the contents of the service session ID information and the like temporarily stored in the authentication information storage section 1038.

The page information generation section 1036 generates video data based on the on-air-list information supplied from the control section 1023. The display control section 1024 converts the generated video data into an analog video signal and sends it to the display section 1025. The display section 1025 displays the on-air-list information as a video based on the analog video signal.

In this manner, the client terminal 1002 can allow the user to acquire intended on-air-list information by using the radio broadcast information delivery service provided by the radio broadcast information delivery server 1006.

(2-7-3-4) Now-On-Air Information Delivery Service Provision Process

Figure 23:
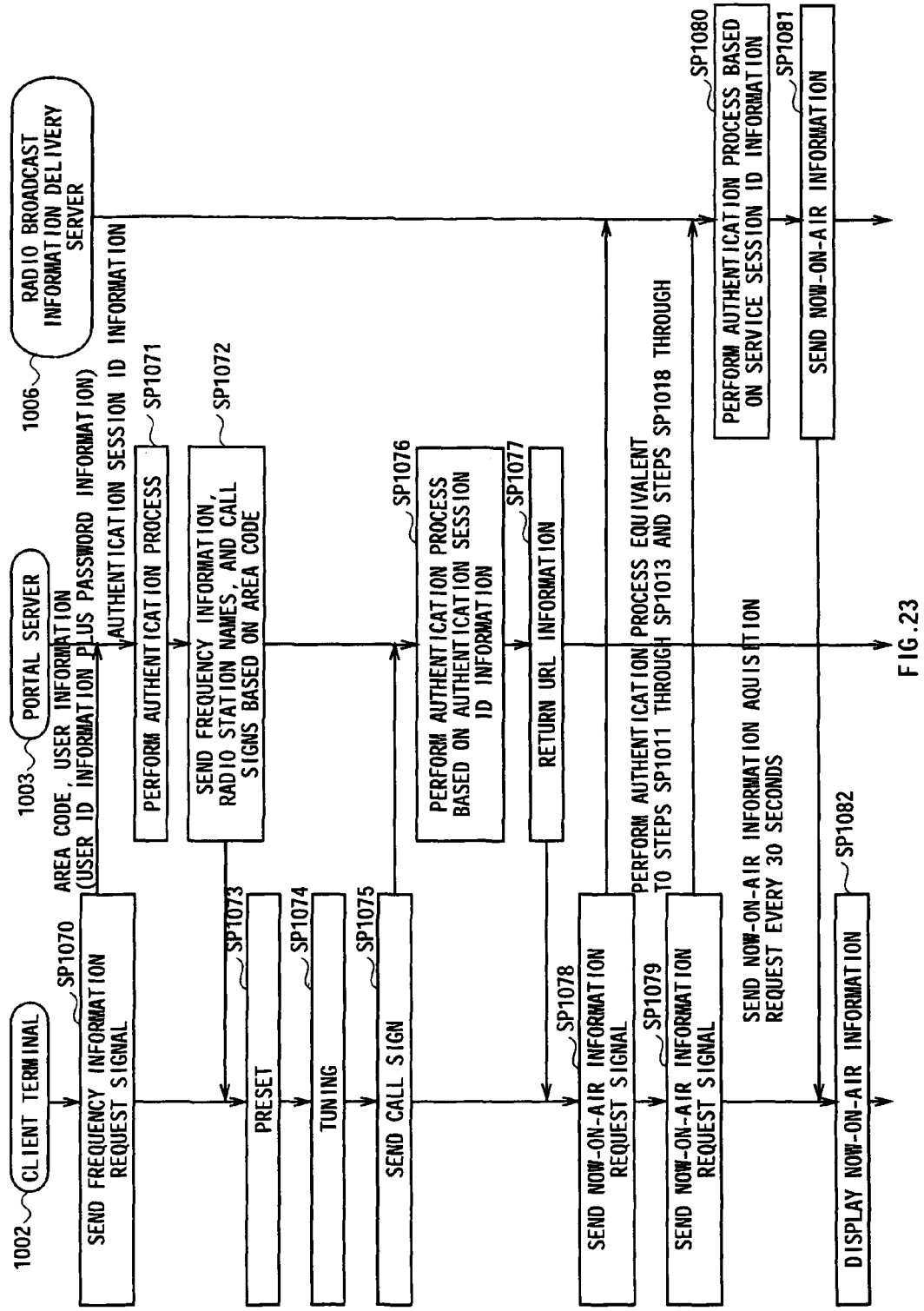
FIG. 23 is a sequence chart showing a radio broadcast information (now-on-air information) delivery service provision process (2).

With reference to FIG. 23, the following describes a radio broadcast information delivery service provision process. During this process, the client terminal 1002 is provided with a radio broadcast information delivery service, especially a now-on-air information delivery service from the radio broadcast information delivery server 1006.

The radio broadcast information delivery server 1006 to supply now-on-air information is provided for each radio station (call sign).

Initially, the client terminal 1002 may not store URL information about the radio broadcast information delivery server 1006 corresponding to each radio station.

The following radio broadcast information delivery service provision process exemplifies a case where the portal server 1003 manages URL information about each radio broadcast information delivery server 1006 for each call sign.

According to the radio broadcast information delivery service provision process, the client terminal 1002 may need to automatically preset a broadcast frequency for each radio station. For this purpose, the client terminal 1002 requests the portal server 1003 for frequency information indicating that broadcast frequency. In such case, it is assumed that the authentication information storage section 1038 does not temporarily store the authentication session ID information and the like. Consequently, the client terminal 1002 first needs to send the user ID information, the password information, and the like to the portal server 1003.

When the input processing section 1021 inputs an operation command to request to automatically preset the broadcast frequency of each radio station. In response to this command, at step SP1070, the control section 1023 of the client terminal 1002 sends a frequency information request signal to request to acquire frequency information about a broadcast frequency which each radio station can receive. The control section 1023 sends the frequency information request signal together with an area code input by the user, the user ID information, the password information, and the like stored in the authentication information storage section 1038 to the portal server 1003 via the communication control section 1032 and the network interface 1033 in order.

At step SP1071, the control section 1050 of the portal server 1003 receives the frequency information request signal, the area code, the user ID information, the password information, and the like sent from the client terminal 1002 via the network interface 1053 and the communication control section 1052 in order. Of these pieces of information, the control section 1050 sends the user ID information, the password information, and the like to the authentication processing section 1056.

Under the control of the control section 1050, the authentication processing section 1056 performs the user authentication process. Specifically, the authentication processing section 1056 compares the received user ID information, the password information, and the like with the customer information registered in the customer database section 1054.

As a result, the authentication processing section 1056 may authenticate the user of the client terminal 1002 to be a registered user. Further, the authentication processing section 1056 may determine that the client terminal 1002 issued a valid request to acquire the frequency information. Under the control of the control section 1050, the authentication processing section 1056 issues the authentication session ID information and the like about the state of communication connection between the client terminal 1002 and the portal server 1003 at the present time. The authentication processing section 1056 temporarily stores the issued authentication session ID information and the like in the authentication information storage section 1057.

The control section 1050 then proceeds to the next step SP1072. At step SP1072, the control section 1050 performs a search based on the area code received from the client terminal 1002. That is to say, the control section 1050 searches a list of a plurality of frequency information, radio station names, and call signs in the frequency information storage section 1058 for those corresponding to the area code and reads them in a list format.

The control section 1050 reads the frequency information, the radio station name, and the call sign in a list form from the frequency information storage section 1058 and sends them along with the authentication session ID information and the like to the client terminal 1002 via the communication control section 1052 and the network interface 1053 in order. The authentication session ID information and the like were issued to the client terminal 1002 by the authentication processing section 1056 at the above-mentioned step SP1071.

At step SP 1073, the control section 1023 of the client terminal 1002 receives the list of frequency information, radio station name, and call sign sent from the portal server 1003 as well as the authentication session ID information and the like via the network interface 1033 and the communication control section 1032 in order. The control section 1023 sends the authentication session ID information and the like received from the portal server 1003 to the authentication processing section 1037. In addition, the control section 1023 sends the list of frequency information, radio station name, and call sign to the display control section 1024.

Under the control of the control section 1023, the authentication processing section 1037 temporarily stores the received authentication session ID information and the like in the authentication information storage section 1038.

The display control section 1024 is supplied with the list of frequency information, radio station name, and call sign from the control section 1023 and sends the list to the display section 1025. The display section 1025 thus displays the list.

At this time, the control section 1023 identifies a selection command supplied from the input processing section 1021. Based on this command, the control section 1023 stores the selected frequency information, radio station name, and call sign as a preset in the storage medium 1029. The control section 1023 then proceeds to the next step SP1074.

At step SP1074, the control section 1023 identifies a tuning control command supplied from the input processing section 1021. Based on this command, the control section 1023 controls the tuner section 1031 so as to extract a radio broadcasting signal from radio broadcasting waves. This radio broadcasting signal should be used for the radio broadcast carried at the broadcast frequency corresponding to the tuning control command.

A broadcast signal reception section 30 receives radio broadcasting waves. Of these radio broadcasting waves, the tuner section 1031 extracts the radio broadcasting signal carried at the broadcast frequency. The tuner section 1031 applies specified reception processes such as decoding to the extracted radio broadcasting signal. As a result, audio data is generated. The tuner section 1031 sends this audio data to the audio control section 1026.

The audio control section 1026 converts the audio data supplied from the tuner section 1031 into an analog audio signal. Then, the audio control section 1026 outputs the analog audio signal to the speaker 1027. The speaker 1027 thus outputs audio of the selected radio program.

At step SP1075, under the control of the control section 1023, the radio broadcasting display control section 1039 reads a call sign from the storage medium 1029. This call sign is stored correspondingly to the frequency information indicating the broadcast frequency corresponding to the above-mentioned tuning control command. The radio broadcasting display control section 1039 sends the read call sign to the portal server 1003 via the communication control section 1032 and the network interface 1033 in order. Likewise, the radio broadcasting display control section 1039 sends authentication session ID information and the like temporarily stored in the authentication information storage section 1038.

At step SP1076, the control section 1050 of the portal server 1003 receives the call sign, the authentication session ID information, and the like sent from the client terminal 1002 via the network interface 1053 and the communication control section 1052 in order. The control section 1050 sends the received authentication session ID information and the like to the authentication processing section 1056.

Under the control of the control section 1050, the authentication processing section 1056 performs the user authentication process. Specifically, the authentication processing section 1056 compares the received authentication session ID information and the like with the received authentication session ID information and the like temporarily stored in the authentication information storage section 1057.

As a result, the authentication processing section 1056 may confirm that the authentication session ID information and the like are received from the client terminal 1002 within the valid period. When the user sent the call sign using the client terminal 1002, the authentication processing section 1056 may authenticate this user to be a registered user. In such case, the control section 1050 proceeds to the next step SP1077.

At step SP1077, the control section 1050 searches a plurality of URL information in the URL storage section 1059 for the URL information corresponding to the call sign based on the call sign received from the client terminal 1002.

The control section 1050 allows the authentication processing section 1056 to extend the valid period of the authentication session ID information and the like issued to the client terminal 1002.

The control section 1050 reads the retrieved URL information from the URL storage section 1059. The control section 1050 sends the read URL information as well as the authentication session ID information and the like having the valid period extended by the authentication processing section 1056 to the client terminal 1002 via the communication control section 1052 and the network interface 1053 in order.

At step SP1078, the control section 1023 of the client terminal 1002 receives the URL information and the authentication session ID information having the extended valid period and the like sent from the portal server 1003 via the network interface 1033 and the communication control section 1032 in order. The control section 1023 sends the received authentication session ID information and the like to the authentication processing section 1037. The control section 1023 sends the URL information to the radio broadcasting display control section 1039.

Under the control of the control section 1023, the authentication processing section 1037 temporarily stores the received authentication session ID information having the extended valid period in the authentication information storage section 1038 to overwrite the authentication session ID information having the valid period not extended. In this manner, the authentication processing section 1037 updates the contents of the authentication session ID information and the like temporarily stored in the authentication information storage section 1038.

Under the control of the control section 1023, the radio broadcasting display control section 1039 temporarily stores the URL information supplied from the control section 1023 in the storage medium 1029 and the like correspondingly to the call sign stored in the storage medium 1029.

Under the control of the control section 1023, the radio broadcasting display control section 1039 follows the URL information temporarily stored in the storage medium 1029 and the like. According to this information, the radio broadcasting display control section 1039 sends a now-on-air information request signal to the radio broadcast information delivery server 1006 via the communication control section 1032 and the network interface 1033 in order. The now-on-air information request signal requests to acquire the now-on-air information. Likewise, the radio broadcasting display control section 1039 sends the service session ID information and the like that are already received from the radio broadcast information delivery server 1006 and are temporarily stored in the authentication information storage section 1038.

In the radio broadcast information delivery service provision process, at step SP1078, the client terminal 1002 sends the now-on-air information request signal, the service session ID information, and the like to the radio broadcast information delivery server 1006. This process corresponds to the process at step SP1010 in FIG. 19 as mentioned above.

Therefore, in the radio broadcast information delivery service provision process, the process at step SP1078 is followed by the user authentication process equivalent to steps SP1011 through SP1013 and steps SP1018 through SP1022 in the client terminal 1002, the radio broadcast information delivery server 1006, and the portal server 1003 as mentioned above with reference to FIG. 19. After these steps are performed in succession, control proceeds to the next step SP1079.

At step SP1079, under the control of the control section 1023, the radio broadcasting display control section 1039 of the client terminal 1002 again follows the URL information temporarily stored in the storage medium 1029 and the like and sends a now-on-air information request signal to the radio broadcast information delivery server 1006 via the communication control section 1032 and the network interface 1033 in order. Likewise, the radio broadcasting display control section 1039 sends the service session ID information and the like that are already received from the radio broadcast information delivery server 1006 and are temporarily stored in the authentication information storage section 1038.

At step SP1080, the control section 1110 of the radio broadcast information delivery server 1006 receives the now-on-air information request signal, the service session ID information, and the like sent from the client terminal 1002 via the network interface 1113 and the communication control section 1112 in order. The control section 1110 sends the received authentication session ID information and the like to the authentication processing section 1115.

Under the control of the control section 1110, the authentication processing section 1115 performs the user authentication process. Specifically, the authentication processing section 1115 compares the received service session ID information and the like with the service session ID information and the like temporarily stored in the authentication information storage section 1120.

As a result, the authentication processing section 1115 may authenticate the user of the client terminal 1002 to be a registered user. In this case, the authentication processing section 1115 determines that the client terminal 1002 issued the valid request to acquire the now-on-air information.

When the authentication processing section 1115 authenticates the user of the client terminal 1002 to be a registered user. In this case, the control section 1110 extends the valid period of the service session ID information and the like issued to the client terminal 1002 by the authentication processing section 1115, and then proceeds to the next step SP1081.

At step SP1081, the control section 1110 reads the now-on-air information from the now-on-air information storage section 1119. The control section 1110 sends the read now-on-air information as well as the service session ID information and the like having the valid period extended by the authentication processing section 1115 to the client terminal 1002 via the communication control section 1112 and the network interface 1113 in order.

At step SP1082, the control section 1023 of the client terminal 1002 receives the now-on-air information and the service session ID information and the like having the extended valid period sent from the radio broadcast information delivery server 1006 via the network interface 1033 and the communication control section 1032 in order. The control section 1023 sends the received service session ID information and the like to the authentication processing section 1037. The control section 1023 sends the now-on-air information to the radio broadcasting display control section 1039.

Under the control of the control section 1023, the authentication processing section 1037 temporarily stores the received service session ID information having the extended valid period and the like in the authentication information storage section 1038 to overwrite the service session ID information having the valid period not extended. In this manner, the authentication processing section 1037 updates the contents of the service session ID information and the like temporarily stored in the authentication information storage section 1038.

Further, the radio broadcasting display control section 1039 sends the now-on-air information supplied from the control section 1023 to the display section 1025 via the display control section 1024. In this manner, the display section 1025 is allowed to display the now-on-air information concerning the radio program in the currently received radio broadcast.

In the radio broadcast information delivery service provision process, the client terminal 1002 thereafter periodically repeats the acquisition request for now-on-air information at step SP1079. The radio broadcast information delivery server 1006 receives the acquisition request from the client terminal 1002 and successively performs the process at steps SP1080 and SP1081.

In this manner, the client terminal 1002 can realtime update the now-on-air information and display it on the display section 1025 of the client terminal 1002. For example, the now-on-air information includes the name of the currently received radio program, the program broadcast start time, the program broadcast end time, the title and artist name of a musical composition currently played in the radio program, and the musical composition broadcast start time.

With the above-mentioned configuration, the content sales system according to the second embodiment can also provide the same effect as for the above-mentioned first embodiment.

According to the description of the above-mentioned first embodiment, the program modules for the client terminal CT (FIG. 7) include the HTTP message program 36 and the communicator program 37. These program modules can implement the same functions as the communication control section 1032 (FIG. 13) of the client terminal 1002 according to the second embodiment.

The content reproduction module 38 (FIG. 7) is a program module capable of implementing the same functions as the encoder/decoder section 1034 (FIG. 13).

The copyright protection information management module 39 (FIG. 7) is a program module capable of implementing the same functions as the copyright management section 1035 (FIG. 13).

The Internet radio channel selection/reproduction module 43 (FIG. 7) is a program module capable of implementing the same functions as the control section 1023 and the audio control section 1026 (FIG. 13).

The musical composition purchase/reproduction module 44 (FIG. 7) is a program module capable of implementing the same functions as the control section 1023 and the audio control section 1026 (FIG. 13).

The XML browser 50 (FIG. 7) is a program module capable of implementing the same functions as the input processing section 1021 and the page information generation section 1036 (FIG. 13).

The hard disk contents controller 42, the database access module 40, and the content data access module 41 (FIG. 7) are program modules capable of implementing the same functions as the control section 1023 (FIG. 13).

The authentication library 47A of the library 47 (FIG. 7) is a program module capable of implementing the same functions as the authentication processing section 1037 and the authentication information storage section 1038 (FIG. 13).

The clip library 47B of the library 47 (FIG. 7) is a program module capable of implementing the same functions as the control section 1023 (FIG. 13).

The associated information display module 45 (FIG. 7) is a program module capable of implementing the same functions as the radio broadcasting display control section 1039 (FIG. 13).

The tuner selection/reproduction/recording module 46 (FIG. 7) is a program module capable of implementing the same functions as the control section 1023, the audio control section 1026, and the tuner section 1031 (FIG. 13).

The audio user interface 51 (FIG. 7) is a program module capable of implementing the same functions as the input processing section 1021, the control section 1023, and the display control section 1024 (FIG. 13).

The CD reproduction module 48 (FIG. 7) is a program module capable of implementing the same functions as the audio control section 1026 and the external recording media recording and reproducing section 1028 (FIG. 13).

The HDD reproduction module 49 (FIG. 7) is a program module capable of implementing the same functions as the control section 1023 and the audio control section 1026 (FIG. 13).

That is to say, the terminal 42 has the hardware circuit block configuration according to the first embodiment as mentioned above. Since the CPU 11 uses various program modules, the terminal 42 can implement the same processes as the client terminal 1002 having the functional circuit block configuration according to the second embodiment.

The URL provision server 3 (FIG. 3) according to the above-mentioned first embodiment is functionally equivalent to the portal server 1003 (FIG. 14) according to the above-mentioned second embodiment. The control section 80 appropriately selects and follows various programs stored in the ROM 81 to function equivalently to the control section 1050, the communication control section 1052, and the authentication processing section 1056 of the portal server 1003. Further, the ROM 81, the RAM 82, and the URL storage DB 83 can be used equivalently to the customer database section 1054, the page information storage section 1055, the authentication information storage section 1057, the frequency information storage section 1058, and the URL storage section 1059 of the portal server 1003.

Further, the associated information provision server KS (FIG. 4) according to the above-mentioned first embodiment is functionally equivalent to the radio broadcast information delivery server 1006 (FIG. 17) according to the above-mentioned second embodiment. The control section 90 appropriately selects and follows various programs stored in the ROM 91 to function equivalently to the control section 1110, the communication control section 1112, the authentication processing section 1115, and the retrieval section 1118 of the radio broadcast information delivery server 1006. It is possible to use the ROM 91, the RAM 92, the musical composition information DB 93, and the program information DB 94 in the same manner as the customer database section 1114, the page information storage section 1116, the on-air-list information storage section 1117, the now-on-air information storage section 1119, and the authentication information storage section 1120 of the radio broadcast information delivery server 1006.

(3) Other Embodiments

In the above-mentioned embodiments, there has been described the case where the associated information provision server KS determines whether or not excess load is applied to the control section 90 based on the number of accesses from the client terminal CT. However, the present invention is not limited thereto. For example, it may be preferable to always monitor the CPU usage rate of the control section 90. When the CPU usage rate exceeds m percent, the control section 90 may be assumed to be subject to excess load.

According to the above-mentioned embodiments, the associated information provision server KS can determine that excess load is applied to the control section 90. In this case, the associated information provision server KS specifies the delay time to delay the request timing from the client terminal CT. However, the present invention is not limited thereto. It may be preferable to specify a time slightly earlier than the normal request timing. In short, the same effect as the embodiments of the present invention is available if it is possible to cause time lag with respect to acquisition requests for the musical composition information from the other client terminals CT.

According to the above-mentioned embodiments, there has been described the case of specifying any longer delay time or later time than the normal polling interval. However, the present invention is not limited thereto. It may be preferable to specify the delay or the time like step SP11 or SP51. According to this technique, the client terminal CT can issue the next acquisition request at the timing when musical composition information changes in a program to update the musical composition information to be supplied.

In this case, the client terminal CT reduces unnecessary processes such as repeatedly acquiring the same musical composition information. Only when musical composition information is updated, the client terminal CT issues an acquisition request for the musical composition information. The client terminal CT can not only efficiently acquire the musical composition information, but also decrease the number of accesses to the associated information provision server KS. This makes it possible to prevent excess traffic on the network.

According to the above-mentioned embodiments, the associated information provision server KS provides the client terminal CT with associated information, i.e., musical composition information associated with musical compositions. However, the present invention is not limited thereto. It may be preferable to search the program information database 94 for program information such as cast, DJ names, and genre associated with a program and provide the client terminal CT with the program information as the associated information.

According to the above-mentioned embodiments, the radio station RS and the associated information provision server KS are provided independently. However, the present invention is not limited thereto. The radio station RS itself may include the associated information provision server KS. The radio station RS may provide associated information to the client terminal CT via the associated information provision server KS.

According to the above-mentioned embodiments, the communication control program is previously stored in the ROM 91. The control section 90 of the associated information provision server KS loads the stored communication control program into the RAM 92. The above-mentioned polling interval control sequence is performed in accordance with the communication control program. However, the present invention is not limited thereto. It may be preferable to store the communication control program on a program storage medium and mount the medium on the associated information provision server KS to perform the polling interval control sequence.

According to the above-mentioned embodiments, the communication control program is previously stored in the ROM 13. The CPU 11 of the client terminal CT loads the stored communication control program into the RAM 20. The above-mentioned polling interval control sequence is performed in accordance with the communication control program. However, the present invention is not limited thereto. It may be preferable to store the communication control program on a program storage medium and mount the medium on the client terminal CT to perform the polling interval control sequence.

According to the above-mentioned first embodiment, the associated information provision server KS functions as the server of the present invention. The associated information provision server KS is configured to comprise the data communication processing section 95 as request information reception means and the control section 90 and the data communication processing section 95 as control means. However, the present invention is not limited thereto. The other various circuits may be used to configure the server.

According to the above-mentioned first embodiment, the client terminal CT functions as the external apparatus and the communication apparatus of the present invention. The client terminal CT is configured to comprise the CPU 11, the communication processing section 22, and the network interface 23 as request information transmission means, the communication processing section 22 and the network interface 23 as timing specification information reception means, and the CPU 11 as determination means. However, the present invention is not limited thereto. The other various circuits may be used to configure the external apparatus.

According to the above-mentioned second embodiment, the radio broadcast information delivery server 1006 functions as the server of the present invention. The radio broadcast information delivery server 1006 is configured to comprise the communication control section 1115 as request information reception means and the control section 1110 and the communication control section 1112 as control means. However, the present invention is not limited thereto. The other various circuits may be used to configure the server.

According to the above-mentioned second embodiment, the client terminal 1002 functions as the external apparatus and the communication apparatus of the present invention. The client terminal 1002 is configured to comprise the control section 1023 and the communication control section 1032 as request information transmission means, the communication control section 1032 as timing specification information reception means, and the control section 1023 as determination means. However, the present invention is not limited thereto. The other various circuits may be used to configure the external apparatus.

According to the above-mentioned embodiment, the client terminal 1002 or CT can receive radio broadcast carried from the radio station. However, the present invention is not limited thereto. The client terminal 1002 or CT may receive Internet radio broadcast or satellite radio broadcast to acquire the associated information (radio broadcast information). Alternatively, the client terminal 1002 or CT may receive television broadcast carried from a television broadcast station and acquire various broadcast information and the like about television programs in the television broadcast from a networked server.

According to the above-mentioned embodiment, the client terminal 1002 or CT is provided with the hardware circuit blocks, the functional circuit blocks, and the program modules. However, the present invention is not limited thereto. These hardware circuit blocks and the like may be installed in not only the client terminal 1002 or CT, but also the other various terminals such as cellular phones, personal computers, and the like. The same processes as implemented on the above-mentioned client terminal 1002 or CT can be also implemented on terminals installed with the hardware circuit blocks, the functional circuit blocks, and the program modules.

INDUSTRIAL APPLICABILITY

The communication method according to the present invention can be applied to the purpose of, for example, avoiding approximately simultaneous concentration of data request information to request data and preventing excess traffic on networks.

EXPLANATION OF REFERENCE SYMBOLS

1: INFORMATION PROVISION SYSTEM
2: INTERNET
3: URL PROVISION SERVER
1002: CLIENT TERMINAL
1003: PORTAL SERVER
1006: RADIO BROADCAST INFORMATION DELIVERY SERVER
RS: RADIO STATION
KS: ASSOCIATED INFORMATION PROVISION SERVER

The invention claimed is:

1. A communication method, comprising:
continuously receiving request information transmitted from an external apparatus on a network interface at a given time interval, the request information requesting associated information about a program being received by the external apparatus on a broadcast signal reception section, the program being transmitted by a second external apparatus;
controlling a polling interval for the request information by transmitting timing specification information used to specify timing for the external apparatus to transmit the request information next along with associated information corresponding to the request information to the external apparatus;
authenticating an authentication session ID received from the external apparatus and, when authentication is permitted, issuing an authentication ticket and transmitting the authentication ticket to the external apparatus; and
receiving a notification from the second external apparatus when transmission of the program begins.

2. The communication method according to claim 1, wherein the controlling step further comprises:
transmitting a delay time until the external apparatus transmits the request information next as the timing specification information to the external apparatus.

3. The communication method according to claim 1, wherein the controlling step further comprises:
transmitting a time for the external apparatus to transmit the request information next as the timing specification information to the external apparatus.

4. The communication method according to claim 1, further comprising:
sequentially storing associated information about an on-air program in a means for storing, wherein
the continuously received request information is used to request the associated information from the external apparatus to receive the program; and
the controlling step manages a polling interval for the request information by transmitting a changeover timing that is used as timing specification information for the external apparatus to transmit the request information next and indicates when the associated information is changed, along with associated information corresponding to the request information to the external apparatus.

5. The communication method according to claim 1, wherein in the receiving step, a server to provide the associated information receives request information transmitted from the external apparatus and a service session ID used as an ID for a session with the server;

the server uses the service session ID to perform an authentication process and, when an authentication error occurs, transmits not only information indicative of an authentication error, but also service identification information identifying the server to the external apparatus;

an authentication server receives authentication ticket issuance request information requesting issuance of the authentication ticket for access to the server and the authentication session ID used as an ID for a session with the authentication server from the external apparatus;

the authentication server performs the step of authenticating;

the server receives the authentication ticket transmitted from the external apparatus and transmits the authentication ticket to the authentication server;

the authentication server, when authenticating the authentication ticket to be valid, transmits information indicating authentication permission to the server;

the server, when receiving information indicating the authentication permission, issues a service session ID as an ID for session with the external apparatus and transmits the service session ID to the external apparatus;

the server receives the request information along with the service session ID from the external apparatus; and the server uses the service session ID to perform an authentication process and, when permitting an authentication, transmits associated information corresponding to the request information to the external apparatus.

6. The communication method according to claim 5, wherein the authentication server authenticates the authentication session ID and, when an authentication error occurs, transmits information indicating an authentication error to the external apparatus;

the authentication server performs an authentication process based on a user ID and password transmitted from the external apparatus and, when permitting an authentication, issues an authentication session ID used as an ID for the session with the authentication server and transmits the authentication session ID to the external apparatus; and the authentication server thereafter receives the authentication ticket issuance request information along with the authentication session ID from the external apparatus.

7. A communication method, comprising:

transmitting, to a server, on a network interface request information requesting associated information about a program being received on a broadcast signal reception section, the program being transmitted by an external apparatus;

receiving associated information corresponding to the request information and timing specification information used to specify timing to transmit the request information next from the server; and determining timing to transmit the request information in accordance with the timing specification information, transmitting an authentication session ID to an authentication server and receiving an authentication ticket from the authentication server, when the authentication server authenticates the authentication session ID and determines that authentication is permitted, wherein the external apparatus notifies the server when transmission of the program begins.

8. A server, comprising:

request information reception means for continuously receiving request information transmitted from an external apparatus on a network interface at a given time interval, the request information requesting associated information about a program being received by the external apparatus on a broadcast signal reception section, and the program being transmitted by a second external apparatus;

control means for controlling a polling interval for the request information by transmitting timing specification information used to specify timing for the external apparatus to transmit the request information next along with associated information corresponding to the request information to the external apparatus, and reception means for receiving a notification from the second apparatus when transmission of the program begins and receiving an authentication ticket from the external apparatus, the authentication ticket being issued by an authentication server that authenticates an authentication session ID provided to the authentication server by the external apparatus and issues the authentication ticket when authentication is permitted.

9. A communication apparatus to request a given server for intended information, the apparatus comprising:

request information transmission means for transmitting, on a network interface, request information requesting associated information about a program being received to the server on a broadcast signal reception section, the program being transmitted by an external apparatus;

timing specification information reception means for receiving associated information corresponding to the request information and timing specification information used to specify timing to transmit the request information next from the server;

timing determination means for determining timing to transmit the request information in accordance with the timing specification information;

means for transmitting an authentication session ID to an authentication server; and means for receiving an authentication ticket from the authentication server, when the authentication server authenticates the authentication session ID and determines that authentication is permitted, wherein the external apparatus notifies the server when transmission of the program begins.

10. A non-transitory computer readable medium encoded thereon with a communication control program which when executed causes an information processing apparatus to:

continuously receive on a network interface request information transmitted from an external apparatus at a given time interval, the request information requesting associated information about a program being received by the external apparatus on a broadcast signal reception section, and the program being transmitted by a second external apparatus;

control a polling interval for the request information by transmitting timing specification information used to specify timing for the external apparatus to transmit the request information next along with associated information corresponding to the request information to the external apparatus;

authenticate an authentication session ID received from the external apparatus and, when authentication is permitted, issue an authentication ticket and transmit the authentication ticket to the exterrnal apparatus, wherein the information processing apparatus receives a notification from the second external apparatus when transmission of the program begins.

11. A non-transitory computer readable medium encoded thereon with a communication control program which when executed causes an information processing apparatus to:

transmit on a network interface request information requesting associated information about a program being received to a server on a broadcast signal reception section, the program being transmitted by an external apparatus;

receive associated information corresponding to the request information and timing specification information used to specify timing to transmit the request information next from the server;

determine timing to transmit the request information in accordance with the timing specification information;

transmit an authentication session ID to an authentication server; and receive an authentication ticket from the authentication server, when the authentication server authenticates the authentication session ID and determines that authentication is permitted, wherein the external apparatus notifies the server when transmission of the program begins.

* * * * *